US012513465B2

(12) United States Patent
Gao et al.

(10) Patent No.: US 12,513,465 B2
(45) Date of Patent: Dec. 30, 2025

(54) METHOD AND APPARATUS FOR DETERMINING VIRTUAL SPEAKER SET

(71) Applicant: HUAWEI TECHNOLOGIES CO., LTD., Guangdong (CN)

(72) Inventors: Yuan Gao, Beijing (CN); Shuai Liu, Beijing (CN); Bin Wang, Shenzhen (CN); Zhe Wang, Beijing (CN); Tianshu Qu, Beijing (CN); Jiahao Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 18/241,698

(22) Filed: Sep. 1, 2023

(65) Prior Publication Data

US 2023/0412981 A1 Dec. 21, 2023

Related U.S. Application Data

(63) Continuation of application No. PCT/CN2022/078824, filed on Mar. 2, 2022.

(30) Foreign Application Priority Data

Mar. 5, 2021 (CN) ......................... 202110247466.1

(51) Int. Cl.
*H04R 5/02* (2006.01)

(52) U.S. Cl.
CPC ......... *H04R 5/02* (2013.01); *H04R 2205/024* (2013.01); *H04S 2420/11* (2013.01)

(58) Field of Classification Search
None
See application file for complete search history.

(56) References Cited

U.S. PATENT DOCUMENTS

2019/0239015 A1* 8/2019 Schevciw ............... H04S 3/006
2019/0379992 A1 12/2019 Schmidt et al.

FOREIGN PATENT DOCUMENTS

CN 105447244 A 3/2016
EP 3209036 A1 8/2017
(Continued)

OTHER PUBLICATIONS

"Advanced sound system for programme production",Recommendation ITU-R BS.2051-2 (Jul. 2018), BS Series Broadcasting service (sound), total 22 pages.
(Continued)

*Primary Examiner* — Duc Nguyen
*Assistant Examiner* — Assad Mohammed
(74) *Attorney, Agent, or Firm* — WOMBLE BOND DICKINSON (US) LLP

(57) ABSTRACT

This application provides a method and an apparatus for determining a virtual speaker set. The method for determining a virtual speaker set includes: determining a target virtual speaker from F preset virtual speakers based on a to-be-processed audio signal, where each of the F virtual speakers corresponds to S virtual speakers, F is a positive integer, and S is a positive integer greater than 1; and obtaining, from a preset virtual speaker distribution table, respective position information of S virtual speakers corresponding to the target virtual speaker, where the virtual speaker distribution table includes position information of K virtual speakers, the position information includes an elevation angle index and an azimuth angle index, K is a positive integer greater than 1, F≤K, and F×S≥K. This application can improve audio signal playback effect.

20 Claims, 9 Drawing Sheets

10

(56) References Cited

FOREIGN PATENT DOCUMENTS

| | | | |
|---|---|---|---|
| JP | 2016536857 | A | 11/2016 |
| JP | 2018534848 | A | 11/2018 |
| JP | 2019062548 | A | 4/2019 |
| KR | 20150038048 | A | 4/2015 |
| KR | 20150111114 | A | 10/2015 |

OTHER PUBLICATIONS

Jakob Vennerød:"Binaural Reproduction of Higher Order Ambisonics", Jun. 1, 2014 (Jun. 1, 2014), pp. 1-97, XP055454025.

* cited by examiner

METHOD AND APPARATUS FOR DETERMINING VIRTUAL SPEAKER SET

CROSS-REFERENCE TO RELATED APPLICATIONS

This application is a continuation of International Application No. PCT/CN2022/078824, filed on Mar. 2, 2022, which claims priority to Chinese Patent Application No. 202110247466.1, filed on Mar. 5, 2021. The disclosures of the aforementioned applications are hereby incorporated by reference in their entireties.

TECHNICAL FIELD

This application relates to the field of audio technologies, and in particular, to a method and an apparatus for determining a virtual speaker set.

BACKGROUND

A three-dimensional audio technology is an audio technology in which sound events and three-dimensional sound field information in real world are obtained, processed, transmitted, rendered, and played back via a computer, through signal processing, and the like. The three-dimensional audio technology makes sound have a strong sense of space, encirclement, and immersion, and gives people "virtual face-to-face" acoustic experience. Currently, a mainstream three-dimensional audio technology is a higher order ambisonics (HOA) technology. Because of a property that in recording and encoding, the HOA technology is irrelevant to a speaker layout during a playback stage and a feature of rotatability of data in an HOA format, the HOA technology has higher flexibility in three-dimensional audio playback, and therefore has gained more attention and wider research.

The HOA technology can convert an HOA signal into a virtual speaker signal, and then obtain, through mapping, a binaural signal for playback. In the foregoing process, even distribution of virtual speakers may achieve a best sampling effect. For example, the virtual speakers are distributed on vertices of a regular tetrahedron. However, in a three-dimensional space, there are only five types of regular polyhedrons: the regular tetrahedron, a regular hexahedron, a regular octahedron, a regular dodecahedron, and a regular icosahedron. Consequently, a quantity of virtual speakers that can be disposed is limited, and this is inapplicable to distribution of virtual speakers of a larger quantity.

SUMMARY

This application provides a method and an apparatus for determining a virtual speaker set, so as to improve an audio signal playback effect.

According to a first aspect, this application provides a method for determining a virtual speaker set, including: determining a target virtual speaker from F preset virtual speakers based on a to-be-processed audio signal, where each of the F virtual speakers corresponds to S virtual speakers, F is a positive integer, and S is a positive integer greater than 1; and obtaining, from a preset virtual speaker distribution table, respective position information of S virtual speakers corresponding to the target virtual speaker, where the virtual speaker distribution table includes position information of K virtual speakers, the position information includes an elevation angle index and an azimuth angle index, K is a positive integer greater than 1, F≤K, and F×S≥K.

In this application, the virtual speaker distribution table is preset, so that a high average value of signal-to-noise ratios (SNRs) of HOA reconstructed signals can be obtained by deploying virtual speakers according to the distribution table, and the S virtual speakers having highest correlations with an HOA coefficient of the to-be-processed audio signal are selected based on such distribution, thereby achieving an optimal sampling effect and improving an audio signal playback effect.

In one embodiment, the determining a target virtual speaker from F preset virtual speakers based on a to-be-processed audio signal includes: obtaining a higher order ambisonics HOA coefficient of the audio signal; obtaining F groups of HOA coefficients corresponding to the F virtual speakers, where the F virtual speakers are in one-to-one correspondence with the F groups of HOA coefficients; and determining, as the target virtual speaker, a virtual speaker corresponding to a group of HOA coefficients that has a greatest correlation with the HOA coefficient of the audio signal and that is in the F groups of HOA coefficients.

Encoding analysis is performed on the to-be-processed audio signal. For example, sound field distribution of the to-be-processed audio signal is analyzed, including characteristics such as a quantity of sound sources, directivity, and dispersion of the audio signal, to obtain the HOA coefficient of the audio signal, and the HOA coefficient of the audio signal is used as one of determining conditions for determining how to select the target virtual speaker. A virtual speaker matching the to-be-processed audio signal may be selected based on the HOA coefficient of the to-be-processed audio signal and the HOA coefficients of candidate virtual speakers (namely, the foregoing F virtual speakers). In this application, the virtual speaker is referred to as the target virtual speaker. An inner product may be separately performed between the HOA coefficients of the F virtual speakers and the HOA coefficient of the audio signal, and a virtual speaker with a maximum absolute value of the inner product is selected as the target virtual speaker. It should be noted that the target virtual speaker may alternatively be determined by using another method, and this is not specifically limited in this application.

In one embodiment, the S virtual speakers corresponding to the target virtual speaker meet the following conditions: the S virtual speakers include the target virtual speaker and (S−1) virtual speakers located around the target virtual speaker, where any one of (S−1) correlations between the (S−1) virtual speakers and the target virtual speaker is greater than each of (K−S) correlations between (K−S) virtual speakers, other than the S virtual speakers, of the K virtual speakers and the target virtual speaker.

When the target virtual speaker is determined, the target virtual speaker is a central virtual speaker having a highest correlation with the HOA coefficient of the to-be-processed audio signal. S virtual speakers corresponding to each central virtual speaker are S virtual speakers having highest correlations with HOA coefficients of the central virtual speaker. Therefore, the S virtual speakers corresponding to the target virtual speaker are also S virtual speakers having highest correlations with the HOA coefficient of the to-be-processed audio signal.

In one embodiment, the K virtual speakers meet the following conditions: the K virtual speakers are distributed on a preset sphere, and the preset sphere includes L latitude regions, where L>1; and an $m^{th}$ latitude region of the L latitude regions includes $T_m$ latitude circles, an azimuth angle difference between adjacent virtual speakers that are in the K virtual speakers and that are distributed on an $m_i^{th}$ latitude circle is $\alpha_m$, $1 \le m \le L$, $T_m$ is a positive integer, and $1 \le m_i \le T_m$, where when $T_m > 1$, an elevation angle difference between any two adjacent latitude circles in the $m^{th}$ latitude region is $\alpha_m$.

In one embodiment, an $n^{th}$ latitude region of the L latitude regions includes $T_n$ latitude circles, an azimuth angle difference between adjacent virtual speakers that are in the K virtual speakers and that are distributed on an $n_i^{th}$ latitude circle is $\alpha_n$, $1 \le m_i \le L$, $T_n$ is a positive integer, and $1 \le n_i \le T_n$, where when $T_n > 1$, an elevation angle difference between any two adjacent latitude circles in the $n^{th}$ latitude region is $\alpha_n$, where $\alpha_n = \alpha_m$ or $\alpha_n \ne \alpha_m$, and $n \ne m$.

In one embodiment, a $c^{th}$ latitude region of the L latitude regions includes $T_c$ latitude circles, one of the $T_c$ latitude circles is an equatorial latitude circle, an azimuth angle difference between adjacent virtual speakers that are in the K virtual speakers and that are distributed on a $c_i^{th}$ latitude circle is $\alpha_c$, $1 \le c \le L$, $T_c$ is a positive integer, and $1 \le c_i \le T_c$, where when $T_c > 1$, an elevation angle difference between any two adjacent latitude circles in the $c^{th}$ latitude region is $\alpha_c$, where $\alpha_c < \alpha_m$, and $c \ne m$.

In one embodiment, the F virtual speakers meet the following conditions: an azimuth angle difference $\alpha_{mi}$ between adjacent virtual speakers that are distributed on the $m_i^{th}$ latitude circle and that are in the F virtual speakers is greater than $\alpha_m$.

In one embodiment, $\alpha_{mi} = q \times \alpha_m$, where q is a positive integer greater than 1.

In one embodiment, a correlation $R_{fk}$ between a $k^{th}$ virtual speaker of the K virtual speakers and the target virtual speaker satisfies the following formula:

$$R_{fk} = B_f(\theta, \varphi) \cdot B_k(\theta, \varphi),$$

where

θ represents an azimuth angle of the target virtual speaker, φ represents an elevation angle of the target virtual speaker, $B_f(\theta, \varphi)$ represents the HOA coefficients of the target virtual speaker, and $B_k(\theta, \varphi)$ represents HOA coefficients of the $k^{th}$ virtual speaker of the K virtual speakers.

According to a second aspect, this application provides an apparatus for determining a virtual speaker set, including: a determining module, configured to determine a target virtual speaker from F preset virtual speakers based on a to-be-processed audio signal, where each of the F virtual speakers corresponds to S virtual speakers, F is a positive integer, and S is a positive integer greater than 1; and an obtaining module, configured to obtain, from a preset virtual speaker distribution table, respective position information of S virtual speakers corresponding to the target virtual speaker, where the virtual speaker distribution table includes position information of K virtual speakers, the position information includes an elevation angle index and an azimuth angle index, K is a positive integer greater than 1, $F \le K$, and $F \times S \ge K$.

In one embodiment, the determining module is specifically configured to: obtain a higher order ambisonics HOA coefficient of the audio signal; obtain F groups of HOA coefficients corresponding to the F virtual speakers, where the F virtual speakers are in one-to-one correspondence with the F groups of HOA coefficients; and determine, as the target virtual speaker, a virtual speaker corresponding to a group of HOA coefficients that has a greatest correlation with the HOA coefficient of the audio signal and that is in the F groups of HOA coefficients.

In one embodiment, the S virtual speakers corresponding to the target virtual speaker meet the following conditions: the S virtual speakers include the target virtual speaker and (S−1) virtual speakers located around the target virtual speaker, where any one of (S−1) correlations between the (S−1) virtual speakers and the target virtual speaker is greater than each of (K−S) correlations between (K−S) virtual speakers, other than the S virtual speakers, of the K virtual speakers and the target virtual speaker.

In one embodiment, the K virtual speakers meet the following conditions: the K virtual speakers are distributed on a preset sphere, and the preset sphere includes L latitude regions, where $L > 1$; and an $m^{th}$ latitude region of the L latitude regions includes $T_m$ latitude circles, an azimuth angle difference between adjacent virtual speakers that are in the K virtual speakers and that are distributed on an $m_i^{th}$ latitude circle is $\alpha_m$, $1 \le m \le L$, $T_m$ is a positive integer, and $1 \le m_i \le T_m$, where when $T_m > 1$, an elevation angle difference between any two adjacent latitude circles in the $m^{th}$ latitude region is $\alpha_m$.

In one embodiment, an $n^{th}$ latitude region of the L latitude regions includes $T_n$ latitude circles, an azimuth angle difference between adjacent virtual speakers that are in the K virtual speakers and that are distributed on an $n_i^{th}$ latitude circle is $\alpha_n$, $1 \le n \le L$, $T_n$ is a positive integer, and $1 \le n_i \le T_n$, where when $T_n > 1$, an elevation angle difference between any two adjacent latitude circles in the $n^{th}$ latitude region is $\alpha_n$, where $\alpha_n = \alpha_m$ or $\alpha_n \ne \alpha_m$, and $n \ne m$.

In one embodiment, a $c^{th}$ latitude region of the L latitude regions includes $T_c$ latitude circles, one of the $T_c$ latitude circles is an equatorial latitude circle, an azimuth angle difference between adjacent virtual speakers that are in the K virtual speakers and that are distributed on a $c_i^{th}$ latitude circle is $\alpha_c$, $1 \le c \le L$, $T_c$ is a positive integer, and $1 \le c_i \le T_c$, where when $T_c > 1$, an elevation angle difference between any two adjacent latitude circles in the $c^{th}$ latitude region is $\alpha_c$, where $\alpha_c < \alpha_m$, and $c \ne m$.

In one embodiment, the F virtual speakers meet the following conditions: an azimuth angle difference $\alpha_{mi}$ between adjacent virtual speakers that are distributed on the $m_i^{th}$ latitude circle and that are in the F virtual speakers is greater than $\alpha_m$.

In one embodiment, $\alpha_{mi} = q \times \alpha_m$, where q is a positive integer greater than 1.

In one embodiment, a correlation $R_{fk}$ between a $k^{th}$ virtual speaker of the K virtual speakers and the target virtual speaker satisfies the following formula:

$$R_{fk} = B_f(\theta, \varphi) B_k(\theta, \varphi),$$

where

θ represents an azimuth angle of the target virtual speaker, φ represents an elevation angle of the target virtual speaker, $B_f(\theta, \varphi)$ represents the HOA coefficients of the target virtual speaker, and $B_k(\theta, \varphi)$ represents HOA coefficients of the $k^{th}$ virtual speaker of the K virtual speakers.

According to a third aspect, this application provides an audio processing device, including: one or more processors; and a memory, configured to store one or more programs. When the one or more programs are executed by the one or more processors, the one or more processors are enabled to implement the method according to any possible implementation of the first aspect.

According to a fourth aspect, this application provides a computer-readable storage medium, including a computer program. When the computer program is executed on a computer, the computer is enabled to perform the method according to any possible implementation of the first aspect.

DESCRIPTION OF EMBODIMENTS

Figure 1:
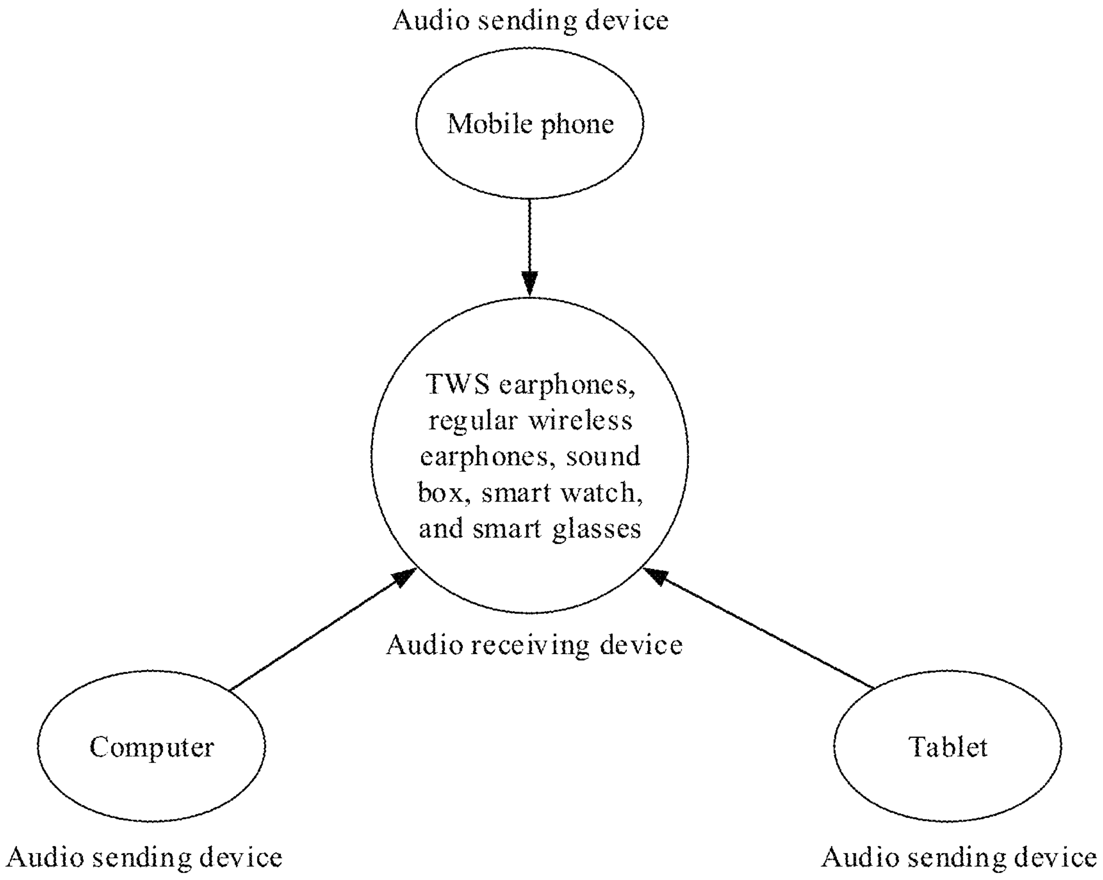
FIG. 1 is an example diagram of a structure of an audio playback system according to this application.

To make the objectives, technical solutions, and advantages of this application clearer, the following clearly describes the technical solutions in this application with reference to the accompanying drawings in this application. It is clear that, the described embodiments are merely some rather than all of embodiments of this application. All other embodiments obtained by a person of ordinary skill in the art based on embodiments of this application without creative efforts shall fall within the protection scope of this application.

In the specification, embodiments, claims, and accompanying drawings of this application, terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of operations or units. Methods, systems, products, or devices are not necessarily limited to those operations or units that are literally listed, but may include other operations or units that are not literally listed or that are inherent to such processes, methods, products, or devices.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following item" or a similar expression thereof indicates any combination of the items, including any combination of a single item or a plural item. For example, at least one of a, b, or c may indicate a, b, c, a and b, a and c, b and c, or a, b, and c, where a, b, and c may be singular or plural. The two values connected by the character ~ usually indicate a value range. The value range contains the two values connected by the character ~.

Explanations of related terms this application are as follows.

Audio frame: Audio data is in a stream form. In an actual application, to facilitate audio processing and transmission, an audio data amount within one piece of duration is usually selected as one frame of audio. The duration is referred to as a "sampling time period", and a value of the duration may be determined based on a requirement of a codec and a requirement of a specific application. For example, the duration ranges from 2.5 ms to 60 ms, where ms is millisecond.

Audio signal: An audio signal is a frequency and amplitude change information carrier of a regular sound wave with voice, music, and a sound effect. Audio is a continuously changing analog signal, and can be represented by a continuous curve and referred to as a sound wave. A digital signal generated from the audio through analog-to-digital conversion or by a computer is the audio signal. The sound wave has three important parameters: frequency, amplitude, and phase, and this determines characteristics of the audio signal.

The following is a system architecture to which this application is applied.

FIG. 1 is an example diagram of a structure of an audio playback system according to this application. As shown in FIG. 1, the audio playback system includes an audio sending device and an audio receiving device. The audio sending device includes a device that can perform audio encoding and send an audio bitstream, for example, a mobile phone, a computer (a notebook computer, a desktop computer, or the like), or a tablet (a handheld tablet or an in-vehicle tablet). The audio receiving device includes a device that can receive, decode, and play the audio bitstream, for example, a true wireless stereo (true wireless stereo, TWS) earphones, common wireless earphones, a sound box, a smart watch, or smart glasses.

A Bluetooth connection may be established between the audio sending device and the audio receiving device, and voice and music transmission may be supported between the audio sending device and the audio receiving device. Broadly applied examples of the audio sending device and the audio receiving device are a mobile phone and the TWS earphones, a wireless head-mounted headset, or a wireless neck ring headset, or the mobile phone and another terminal device (such as a smart sound box, a smart watch, smart glasses, or an in-vehicle sound box). In one embodiment, examples of the audio sending device and the audio receiving device may alternatively be a tablet computer, a notebook computer, or a desktop computer and the TWS earphones, a wireless head-mounted headset, a wireless neck ring headset, or another terminal device (such as a smart sound box, a smart watch, smart glasses, or an in-vehicle sound box).

It should be noted that, in addition to the Bluetooth connection, the audio sending device and the audio receiving device may be connected in another communication manner, for example, a Wi-Fi connection, a wired connection, or another wireless connection. This is not specifically limited in this application.

Figure 2:
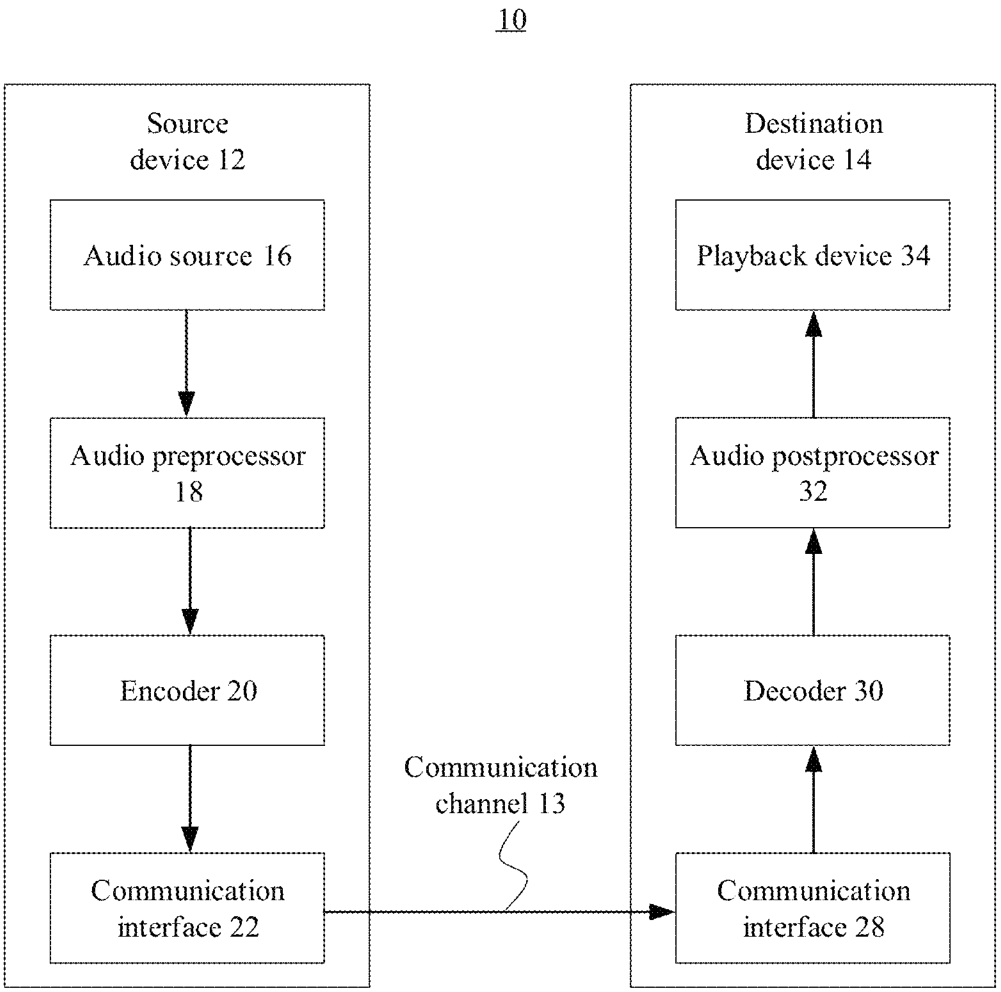
FIG. 2 is an example diagram of a structure of an audio decoding system 10 according to this application.

FIG. 2 is an example diagram of a structure of an audio decoding system 10 according to this application. As shown in FIG. 2, the audio decoding system 10 may include a source device 12 and a destination device 14. The source device 12 may be the audio sending device in FIG. 1, and the destination device 14 may be the audio receiving device in FIG. 1. The source device 12 generates an encoded bitstream. Therefore, the source device 12 may also be referred to as an audio encoding device. The destination device 14 may decode the encoded bitstream generated by the source device 12. Therefore, the destination device 14 may be referred to as an audio decoding device. In this application, the source device 12 and the audio encoding device may be collectively referred to as an audio sending device, and the destination device 14 and the audio decoding device may be collectively referred to as an audio receiving device.

The source device 12 includes an encoder 20, and In one embodiment, may include an audio source 16, an audio preprocessor 18, and a communication interface 22.

The audio source 16 may include or may be any type of audio capturing device, for example, capturing real-world sound, and/or any type of audio generation device, for example, a computer audio processor, or any type of device configured to obtain and/or provide real-world audio or computer animation audio (such as audio in screen content or virtual reality (VR)), and/or any combination thereof (for example, audio in augmented reality (AR), audio in mixed reality (MR), and/or audio in extended reality (XR)). The audio source 16 may be a microphone for capturing audio or a memory for storing audio. The audio source 16 may further include any type of (internal or external) interface for storing previously captured or generated audio and/or obtaining or receiving audio. When the audio source 16 is a microphone, the audio source 16 may be, for example, a local audio collection apparatus or an audio collection apparatus integrated into the source device. When the audio source 16 is a memory, the audio source 16 may be, for example, a local memory or a memory integrated into the source device. When the audio source 16 includes an interface, the interface may be, for example, an external interface for receiving audio from an external audio source. The external audio source is, for example, an external audio capturing device, such as a microphone, an external memory, or an external audio generation device. The external audio generation device is, for example, an external computer audio processor, a computer, or a server. The interface may be any type of interface, for example, a wired or wireless interface or an optical interface, according to any proprietary or standardized interface protocol.

In this application, the audio source 16 obtains a current-scenario audio signal. The current-scenario audio signal is an audio signal obtained by collecting a sound field at a position of a microphone in space, and the current-scenario audio signal may also be referred to as an original-scenario audio signal. For example, the current-scenario audio signal may be an audio signal obtained through a higher order ambisonics (HOA) technology. The audio source 16 obtains a to-be-encoded HOA signal, for example, may obtain the HOA signal by using an actual collection device, or may syn$^{th}$esize the HOA signal by using an artificial audio object. In one embodiment, the to-be-encoded HOA signal may be a time-domain HOA signal or a frequency-domain HOA signal.

The audio preprocessor 18 is configured to receive an original audio signal and perform preprocessing on the original audio signal, to obtain a preprocessed audio signal. For example, preprocessing performed by the audio preprocessor 18 may include trimming or denoising.

The encoder 20 is configured to: receive the preprocessed audio signal, and process the preprocessed audio signal, so as to provide the encoded bitstream.

The communication interface 22 in the source device 12 may be configured to: receive the bitstream and send the bitstream to the destination device 14 through a communication channel 13. The communication channel 13 is, for example, a direct wired or wireless connection, and any type of network is, for example, a wired or wireless network or any combination thereof, or any type of private network and public network, or any combination thereof.

The destination device 14 includes a decoder 30, and In one embodiment, may include a communication interface 28, an audio postprocessor 32, and a playing device 34.

The communication interface 28 in the destination device 14 is configured to: directly receive the bitstream from the source device 12, and provide the bitstream for the decoder 30. The communication interface 22 and the communication interface 28 may be configured to send or receive the bitstream through the communication channel 13 between the source device 12 and the destination device 14.

The communication interface 22 and the communication interface 28 each may be configured as a unidirectional communication interface indicated by an arrow that is from the source device 12 to the destination device 14 and that corresponds to the communication channel 13 in FIG. 2 or a bidirectional communication interface, and may be configured to: send and receive a message or the like to establish a connection, confirm and exchange any other information related to a communication link and/or transmission of data such as encoded audio data.

The decoder 30 is configured to: receive the bitstream, and decode the bitstream to obtain decoded audio data.

The audio postprocessor 32 is configured to perform post-processing on the decoded audio data to obtain post-processed audio data. Post-processing performed by the audio postprocessor 32 may include, for example, trimming or resampling.

The playing device 34 is configured to receive the post-processed audio data, to play audio to a user or a listener. The playing device 34 may be or include any type of player configured to play reconstructed audio, for example, an integrated or external speaker. For example, the speaker may include a horn, a sound box, and the like.

Figure 3:
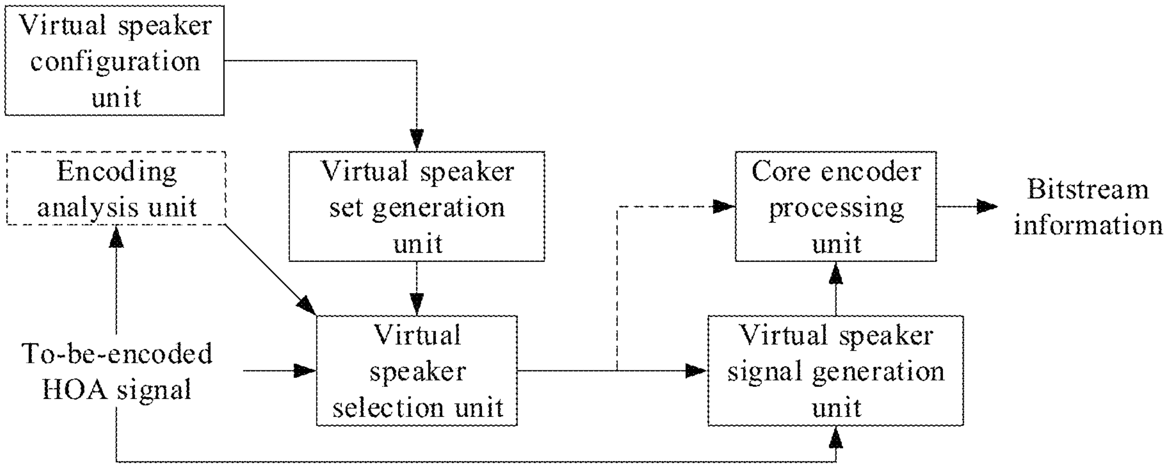
FIG. 3 is an example diagram of a structure of an HOA encoding apparatus according to this application.

FIG. 3 is an example diagram of a structure of an HOA encoding apparatus according to this application. As shown in FIG. 3, the HOA encoding apparatus may be used in the encoder in the foregoing audio decoding system 10. The HOA encoding apparatus includes a virtual speaker configuration unit, an encoding analysis unit, a virtual speaker set generation unit, a virtual speaker selection unit, a virtual speaker signal generation unit, and a core encoder processing unit.

The virtual speaker configuration unit is configured to configure a virtual speaker based on encoder configuration information, to obtain a virtual speaker configuration parameter. The encoder configuration information includes but is not limited to: an HOA order, an encoding bit rate, user-defined information, and the like. The virtual speaker configuration parameter includes but is not limited to: a quantity of virtual speakers, an HOA order of the virtual speaker, and the like.

The virtual speaker configuration parameter output by the virtual speaker configuration unit is used as an input of the virtual speaker set generation unit.

The encoding analysis unit is configured to perform encoding analysis on a to-be-encoded HOA signal, for example, analyze sound field distribution of the to-be-encoded HOA signal, including characteristics such as a quantity of sound sources, directivity, and dispersion of the to-be-encoded HOA signal for obtaining one of determining conditions for determining how to select a target virtual speaker.

In this application, the HOA encoding apparatus may alternatively not include an encoding analysis unit, in other words, the HOA encoding apparatus may not analyze an input signal. This is not limited. In this case, a default configuration is used to determine how to select the target virtual speaker.

The HOA encoding apparatus obtains the to-be-encoded HOA signal. For example, an HOA signal recorded by an actual collection device or an HOA signal syn$^{th}$esized by using an artificial audio object may be used as an input of the encoder, and the to-be-encoded HOA signal input into the encoder may be a time-domain HOA signal or a frequency-domain HOA signal.

The virtual speaker set generation unit is configured to generate a virtual speaker set, where the virtual speaker set may include a plurality of virtual speakers, and the virtual speaker in the virtual speaker set may also be referred to as a "candidate virtual speaker".

The virtual speaker set generation unit generates HOA coefficients of a specified candidate virtual speaker. Coordinates (namely, position information) of the candidate virtual speaker and an HOA order of the candidate virtual speaker that are provided by the virtual speaker configuration unit are used to generate the HOA coefficients of the candidate virtual speaker. A method for determining the coordinates of the candidate virtual speaker includes but is not limited to generating K virtual speakers according to an equal-distance rule, and generating, according to an auditory perception principle, K candidate virtual speakers that are not evenly distributed. Coordinates of evenly distributed candidate virtual speakers are generated based on a quantity of candidate virtual speakers.

Next, HOA coefficients of a virtual speaker are generated. A sound wave is transmitted in an ideal medium. A wave speed of the sound wave is k=w/c, and an angular frequency is w=2πf, where f indicates sound wave frequency, and c indicates a sound speed. Therefore, a sound pressure p satisfies the following formula (1):

$$\nabla^2 p+k^2 p=0 \quad (1),$$

where $\nabla^2$ is a Laplacian operator.

The following formula (2) may be obtained for the sound pressure p by solving the formula (1) in spherical coordinates:

$$p(r,\theta,\varphi,k)=s\Sigma_{m=0}^{\infty}(2m+1)j^m j_m^{kr}(kr)\Sigma_{0\le n\le m,\sigma=\pm1}Y_{m,n}^{\sigma}(\theta_s,\varphi_s)Y_{m,n}^{\sigma}(\theta,\varphi) \quad (2),$$

where r represents a spherical radius, θ represents an azimuth angle (azimuth) (where the azimuth angle may also be referred to as an azimuth), φ represents an elevation angle (elevation), k represents a wave velocity, s represents an amplitude of an ideal plane wave, m represents a sequence number of an HOA order, $j^m j_m^{kr}$(kr) represents a spherical Bessel function, and is also referred to as a radial basis function, where the 1$^{st}$ j is an imaginary unit, $(2m+1)j^m j_m^{kr}$(kr) does not change with an angle, $Y_{m,n}^{\sigma}(\theta, \varphi)$ is a spherical harmonics function corresponding to θ and φ, and $Y_{m,n}^{\sigma}(\theta_s, \varphi_s)$ is a spherical harmonics function in a sound source direction.

An ambisonics (Ambisonics) coefficient is:

$$B_{m,n}^{\sigma}=s\cdot Y_{m,n}^{\sigma}(\theta_s,\varphi_s) \quad (3)$$

Therefore, a general expansion form (4) of the sound pressure p may be obtained as follows:

$$p(r,\theta,\varphi,k)=\Sigma_{m=0}^{\infty}j^m j_m^{kr}(kr)\Sigma_{0\le n\le m,\sigma=\pm1}B_{m,n}^{\sigma}Y_{m,n}^{\sigma}(\theta,\varphi) \quad (4)$$

The foregoing formula (3) may indicate that a sound field may be expanded on a spherical surface based on a spherical harmonics function, and the sound field is represented based on the ambisonics coefficient.

Correspondingly, if the ambisonics coefficient is known, the sound field may be reconstructed. By using the ambisonics coefficient as an approximate description of the sound field, when the formula (3) is truncated to an N$^{th}$ item, the ambisonics coefficient is referred to as an N-order HOA coefficient, where the HOA coefficient is also referred to as an ambisonics coefficient. The N-order ambisonics coefficient has $(N+1)^2$ channels in total. In one embodiment, an HOA order may range from 2-order to 10-order. When the spherical harmonics function is superposed based on a coefficient corresponding to a sampling point of the HOA signal, a spatial sound field at a moment corresponding to the sampling point can be reconstructed. The HOA coefficients of the virtual speaker may be generated according to this principle. $\theta_s$ and $\varphi_s$ in formula (3) are respectively set to the azimuth angle and the elevation angle, namely, the position information of the virtual speaker, and the HOA coefficients, also referred to as ambisonics coefficients, of the virtual speaker may be obtained according to the formula (3). For example, for a 3-order HOA signal, assuming that s=1, HOA coefficients that are of 16 channels and that correspond to the 3-order HOA signal may be obtained based on the spherical harmonic function $Y_{m,n}^{\sigma}(\theta_s, \varphi_s)$. A formula for calculating the HOA coefficients that are of 16 channels and that correspond to the 3-order HOA signal is specifically shown in Table 1.

TABLE 1

| l | m | Expression in polar coordinates |
|---|---|---|
| 0 | 0 | $\frac{1}{2\sqrt{\pi}}$ |
| 1 | 0 | $\frac{1}{2}\sqrt{\frac{3}{\pi}}\cos\theta$ |
| | +1 | $\frac{1}{2}\sqrt{\frac{3}{\pi}}\sin\theta\cos\varphi$ |
| | −1 | $\frac{1}{2}\sqrt{\frac{3}{\pi}}\sin\theta\sin\varphi$ |
| 2 | 0 | $\frac{1}{4}\sqrt{\frac{5}{\pi}}(3\cos^2\theta-1)$ |
| | +1 | $\frac{1}{2}\sqrt{\frac{15}{\pi}}\sin\theta\cos\theta\cos\varphi$ |
| | −1 | $\frac{1}{2}\sqrt{\frac{15}{\pi}}\sin\theta\cos\theta\sin\varphi$ |
| | +2 | $\frac{1}{4}\sqrt{\frac{15}{\pi}}\sin^2\theta\cos 2\varphi$ |
| | −2 | $\frac{1}{4}\sqrt{\frac{15}{\pi}}\sin^2\theta\sin 2\varphi$ |
| 3 | 0 | $\frac{1}{4}\sqrt{\frac{7}{\pi}}(5\cos^3\theta-3\cos\theta)$ |
| | +1 | $\frac{1}{4}\sqrt{\frac{21}{2\pi}}(5\cos^2\theta-1)\sin\theta\cos\varphi$ |
| | −1 | $\frac{1}{4}\sqrt{\frac{21}{2\pi}}(5\cos^2\theta-1)\sin\theta\sin\varphi$ |

TABLE 1-continued

| l | m | Expression in polar coordinates |
|---|---|---|
| | +2 | $\frac{1}{4}\sqrt{\frac{105}{\pi}}\cos\theta\sin^2\theta\cos 2\varphi$ |
| | −2 | $\frac{1}{4}\sqrt{\frac{105}{\pi}}\cos\theta\sin^2\theta\sin 2\varphi$ |
| | +3 | $\frac{1}{4}\sqrt{\frac{35}{2\pi}}\sin^3\theta\cos 3\varphi$ |
| | −3 | $\frac{1}{4}\sqrt{\frac{35}{2\pi}}\sin^3\theta\sin 3\varphi$ |

In Table 1, θ represents the azimuth angle in the position information of the virtual speaker on a preset sphere; φ represents the elevation angle in the position information of the virtual speaker on the preset sphere; l represents the HOA order, where l=0, 1, . . . , N; and m represents a direction parameter in each order, where m=−l, . . . , l. According to the expression in the polar coordinates in Table 1, the HOA coefficients that are of 16 channels and that correspond to the 3-order HOA signal of the virtual speaker may be obtained based on the position information of the virtual speaker.

The HOA coefficients of the candidate virtual speaker output by the virtual speaker set generation unit are used as an input of the virtual speaker selection unit.

The virtual speaker selection unit is configured to select, based on the to-be-encoded HOA signal, the target virtual speaker from the plurality of candidate virtual speakers that are in the virtual speaker set, where the target virtual speaker may be referred to as a "virtual speaker matching the to-be-encoded HOA signal", or referred to as a matching virtual speaker for short.

The virtual speaker selection unit selects a specified matching virtual speaker based on the to-be-encoded HOA signal and the HOA coefficients of the candidate virtual speaker output by the virtual speaker set generation unit.

The following uses an example to describe a method for selecting a matching virtual speaker. In one embodiment, an inner product is performed between the HOA coefficient of the candidate virtual speaker and an HOA coefficient of the to-be-encoded HOA signal, a candidate virtual speaker with a maximum absolute value of the inner product is selected as the target virtual speaker, namely, the matching virtual speaker, a projection, on the candidate virtual speaker, of the to-be-encoded HOA signal is superposed on a linear combination of the HOA coefficients of the candidate virtual speaker, and then a projection vector is subtracted from the to-be-encoded HOA signal to obtain a difference. The foregoing process is repeated on the difference to implement iterative calculation. A matching virtual speaker is generated at each iteration, and coordinates of the matching virtual speaker and HOA coefficients of the matching virtual speaker are output. It may be understood that a plurality of matching virtual speakers are selected, and one matching virtual speaker is generated at each iteration. (In addition, other implementation methods are not limited.)

The coordinates of the target virtual speaker and the HOA coefficients of the target virtual speaker that are output by the virtual speaker selection unit are used as inputs of the virtual speaker signal generation unit.

The virtual speaker signal generation unit is configured to generate a virtual speaker signal based on the to-be-encoded HOA signal and attribute information of the target virtual speaker. When the attribute information is position information, the HOA coefficients of the target virtual speaker are determined based on the position information of the target virtual speaker. When the attribute information includes the HOA coefficients, the HOA coefficients of the target virtual speaker are obtained from the attribute information.

The virtual speaker signal generation unit calculates the virtual speaker signal based on the to-be-encoded HOA signal and the HOA coefficients of the target virtual speaker.

The HOA coefficients of the virtual speaker are represented by a matrix A, and the to-be-encoded HOA signal may be obtained through linear combination by using the matrix A.

Further, a theoretical optimal solution w, namely, the virtual speaker signal, may be obtained by using a least square method. For example, the following calculation formula may be used:

$$w=A^{-1}X$$

$A^{-1}$ represents an inverse matrix of the matrix A, a size of the matrix A is (M×C), C is a quantity of target virtual speakers, M is a quantity of channels of an N-order HOA coefficient, $M=(N+1)^2$, and a represents the HOA coefficients of the target virtual speaker. For example, $$A=\begin{bmatrix} a_{11} & \cdots & a_{1C} \\ \vdots & \ddots & \vdots \\ a_{M1} & \cdots & a_{MC} \end{bmatrix}$$

X represents the to-be-encoded HOA signal, a size of the matrix X is (M×L), M is the quantity of channels of the N-order HOA coefficient, L is a quantity of time domain or frequency domain sampling points, and x represents a coefficient of the to-be-encoded HOA signal. For example, $$X=\begin{bmatrix} x_{11} & \cdots & x_{1L} \\ \vdots & \ddots & \vdots \\ x_{M1} & \cdots & x_{ML} \end{bmatrix}$$

The virtual speaker signal output by the virtual speaker signal generation unit is used as an input of the core encoder processing unit.

The core encoder processing unit is configured to perform core encoder processing on the virtual speaker signal to obtain a transmission bitstream.

The core encoder processing includes but is not limited to transformation, quantization, a psychoacoustic model, bitstream generation, and the like, and may process a frequency domain transmission channel or a time domain transmission channel. This is not limited herein.

Based on the descriptions of the foregoing embodiment, this application provides a method for determining a virtual speaker set. The method for determining a virtual speaker set is based on the following presetting.

1. Virtual Speaker Distribution Table

A virtual speaker distribution table includes position information of K virtual speakers, where the position information includes an elevation angle index and an azimuth angle index, and K is a positive integer greater than 1. The K virtual speakers are set to be distributed on a preset sphere. The preset sphere may include X latitude circles and Y longitude circles. X and Y may be the same or different. Both X and Y are positive integers. For example, X is 512, 768, 1024, or the like, and Y is 512, 768, 1024, or the like. The virtual speaker is located at an intersection point of the X latitude circles and the Y longitude circles. Larger values of X and Y indicate more candidate selection positions of the virtual speaker, and a better playback effect of a sound field formed by a finally selected virtual speaker.

Figure 4A:
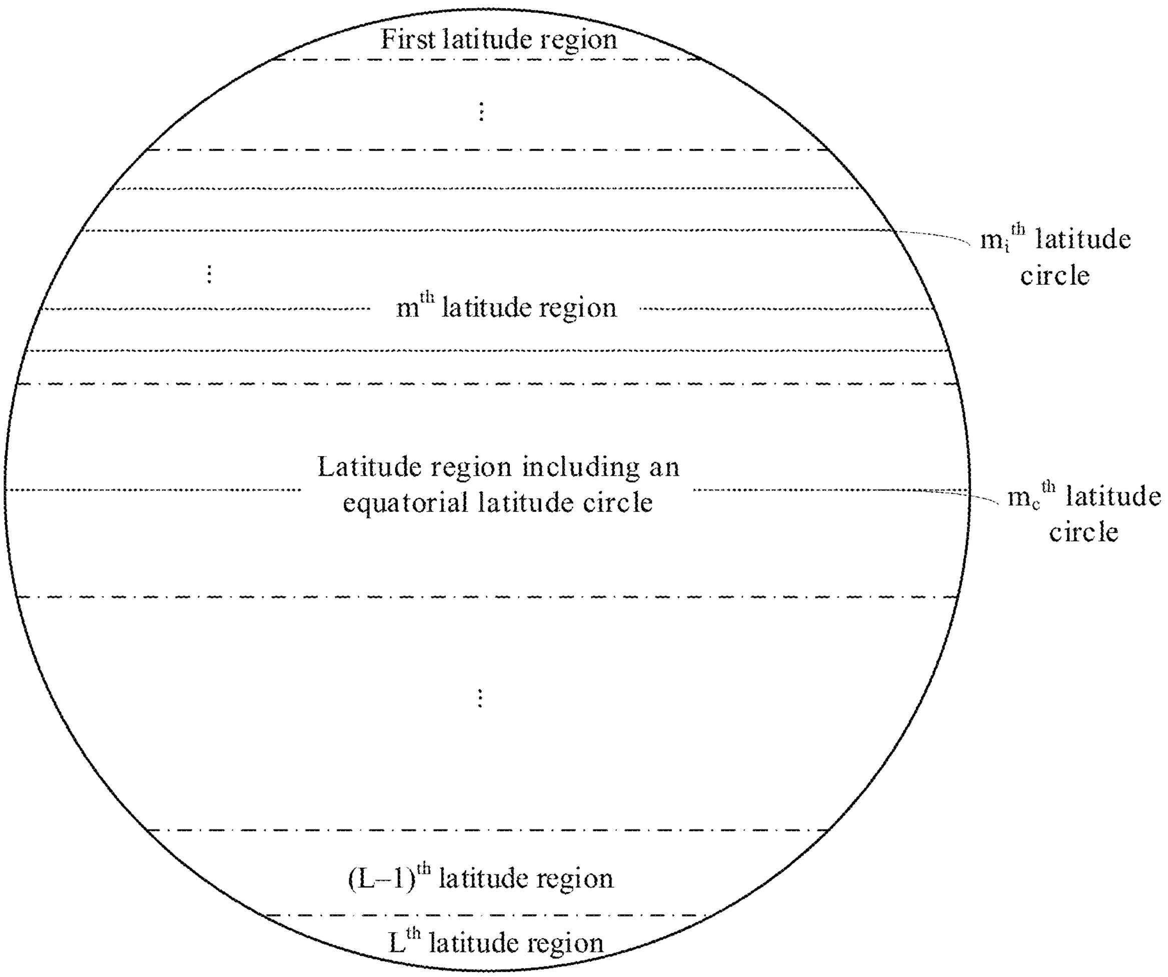
FIG. 4*a* is an example schematic diagram of a preset sphere according to this application.
Figure 4B:
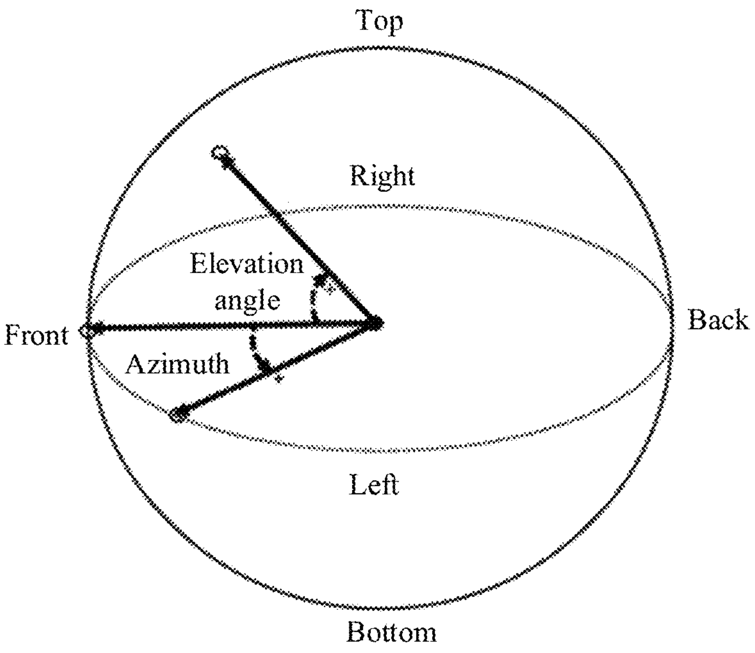
FIG. 4*b* is an example schematic diagram of an elevation angle and an azimuth angle according to this application.

FIG. 4*a* is an example schematic diagram of a preset sphere according to this application. As shown in FIG. 4*a*, the preset sphere includes L (L>1) latitude regions, an $m^{th}$ latitude region includes $T_m$ latitude circles, an azimuth angle difference between adjacent virtual speakers distributed on an $m_i^{th}$ latitude circle in the K virtual speakers is $\alpha_m$, $1 \le m \le L$, $T_m$ is a positive integer, and $1 \le m_i \le Tm$. When $T_m > 1$, an elevation angle difference between any two adjacent latitude circles in the $m^{th}$ latitude region is $\alpha_m$. FIG. 4*b* is a schematic diagram of an example of an elevation angle and an azimuth angle according to this application. As shown in FIG. 4*b*, an included angle between a connection line between a position of a virtual speaker and a sphere center and a preset horizontal plane (for example, a plane on which an equatorial circle is located, a plane on which a south pole point is located, or a plane on which a north pole point is located, where the plane on which the south pole point is located is perpendicular to a connection line between the south pole point and the north pole point, and the plane on which the north pole point is located is perpendicular to the connection line between the south pole point and the north pole point) is an elevation angle of the virtual speaker. An included angle between a projection, on the horizontal plane, of the connection line between the position of the virtual speaker and the sphere center and a set initial direction is an azimuth angle of the virtual speaker.

It should be understood that, the K virtual speakers are distributed on one or more latitude circles in each latitude region, distances between adjacent virtual speakers located on a same latitude circle are represented by using an azimuth angle difference, and azimuth angle differences between all adjacent virtual speakers on a same latitude circle are equal. For example, an azimuth angle difference between any two adjacent virtual speakers on the $m_i^{th}$ latitude circle is $\alpha_m$. For virtual speakers located in a same latitude region, if the latitude region includes a plurality of latitude circles, there is a same azimuth angle difference between adjacent virtual speakers in any latitude circle in the latitude region. For example, in the $m^{th}$ latitude region, an azimuth angle difference between adjacent virtual speakers on the $m_i^{th}$ latitude circle and an azimuth angle difference between adjacent virtual speakers on an $m_{i+1}{}^{th}$ latitude circle are both am. In addition, if a latitude region includes a plurality of latitude circles, a distance between the latitude circles in the latitude region is represented by an elevation angle difference, and an elevation angle difference between any two adjacent latitude circles is equal to the azimuth angle difference between adjacent virtual speakers in the latitude region.

In one embodiment, $\alpha_n = \alpha_m$ or $\alpha_n \ne \alpha_m$, where $\alpha_n$ is an azimuth angle difference between adjacent virtual speakers that are in the K virtual speakers and that are distributed on any latitude circle in an $n^{th}$ latitude region, and $n \ne m$.

In other words, for virtual speakers located in different latitude regions, azimuth angle differences between adjacent virtual speakers may be equal, where $\alpha_n = \alpha_m$, or may be unequal, where $\alpha_n \ne \alpha_m$. It should be understood that, in this application, azimuth angle differences between adjacent virtual speakers in L latitude regions may be all equal, or azimuth angle differences between adjacent virtual speakers in L latitude regions may be all unequal, or even azimuth angle differences between adjacent virtual speakers in some of L latitude regions may be equal, and such azimuth angle differences and azimuth angle differences between adjacent virtual speakers in the other latitude regions may be unequal. These are not limited.

In one embodiment, $\alpha_c < \alpha_m$, $\alpha_c$ is an azimuth angle difference between adjacent virtual speakers distributed on an $m_c^{th}$ latitude circle in the K virtual speakers, and the $m_c^{th}$ latitude circle is any latitude circle in a latitude region that is in the L latitude regions and that includes an equatorial latitude circle.

To be specific, in the L latitude regions, the azimuth angle difference between adjacent virtual speakers in the latitude region including the equatorial latitude circle is the smallest, in other words, in the L latitude regions, virtual speakers in the latitude region including the equatorial latitude circle are most densely distributed.

In one embodiment, positions of the K virtual speakers in the virtual speaker distribution table may be represented in an index manner, and an index may include an elevation angle index and an azimuth angle index. For example, on any latitude circle, an azimuth angle of one of virtual speakers distributed on the latitude circle is set to 0, and then a corresponding azimuth angle index is obtained through conversion according to a preset conversion formula between an azimuth angle and an azimuth angle index. Because azimuth angle differences between any adjacent virtual speakers on the latitude circle are equal, azimuth angles of other virtual speakers on the latitude circle may be obtained, so as to obtain azimuth angle indexes of the other virtual speakers according to the foregoing conversion formula. It should be noted that a specific virtual speaker, on the latitude circle, whose azimuth angle is set to 0 is not specifically limited in this application. Similarly, because elevation angle differences between adjacent virtual speakers in a longitude circle direction meet the foregoing requirement, after a virtual speaker whose elevation angle is 0 is set, elevation angles of other virtual speakers may be obtained, and elevation angle indexes of all virtual speakers on the longitude circle may be obtained according to a conversion formula between a preset elevation angle and an elevation angle index. It should be noted that, in this application, a virtual speaker, on the longitude circle, whose elevation angle is set to 0 is not specifically limited. For example, the virtual speaker may be a virtual speaker located on the equatorial circle, or a virtual speaker located on the south pole, or a virtual speaker located on the north pole.

In one embodiment, an elevation angle $\varphi_k$ and an elevation angle index $\varphi_k'$ of a $k^{th}$ virtual speaker in the K virtual speakers satisfy the following formula (namely, the conversion formula between the elevation angle and the elevation angle index):

$$\varphi_k' = \text{round}\left(\frac{\varphi_k}{2\pi r_k \times N}\right)$$

$r_k$ represents a radius of a longitude circle in which the $k^{th}$ virtual speaker is located, and round( ) represents rounding.

An azimuth angle $\theta_k$ and an azimuth angle index $\theta_k'$ of the $k^{th}$ virtual speaker in the K virtual speakers satisfy the following formula (namely, the conversion formula between the azimuth angle and the azimuth angle index):

$$\theta_k' = \text{round}\left(\frac{\theta_k}{2\pi r_k \times M}\right)$$

$r_k$ represents a radius of a latitude circle in which the $k^{th}$ virtual speaker is located, and round( ) represents rounding.

Figure 5A:
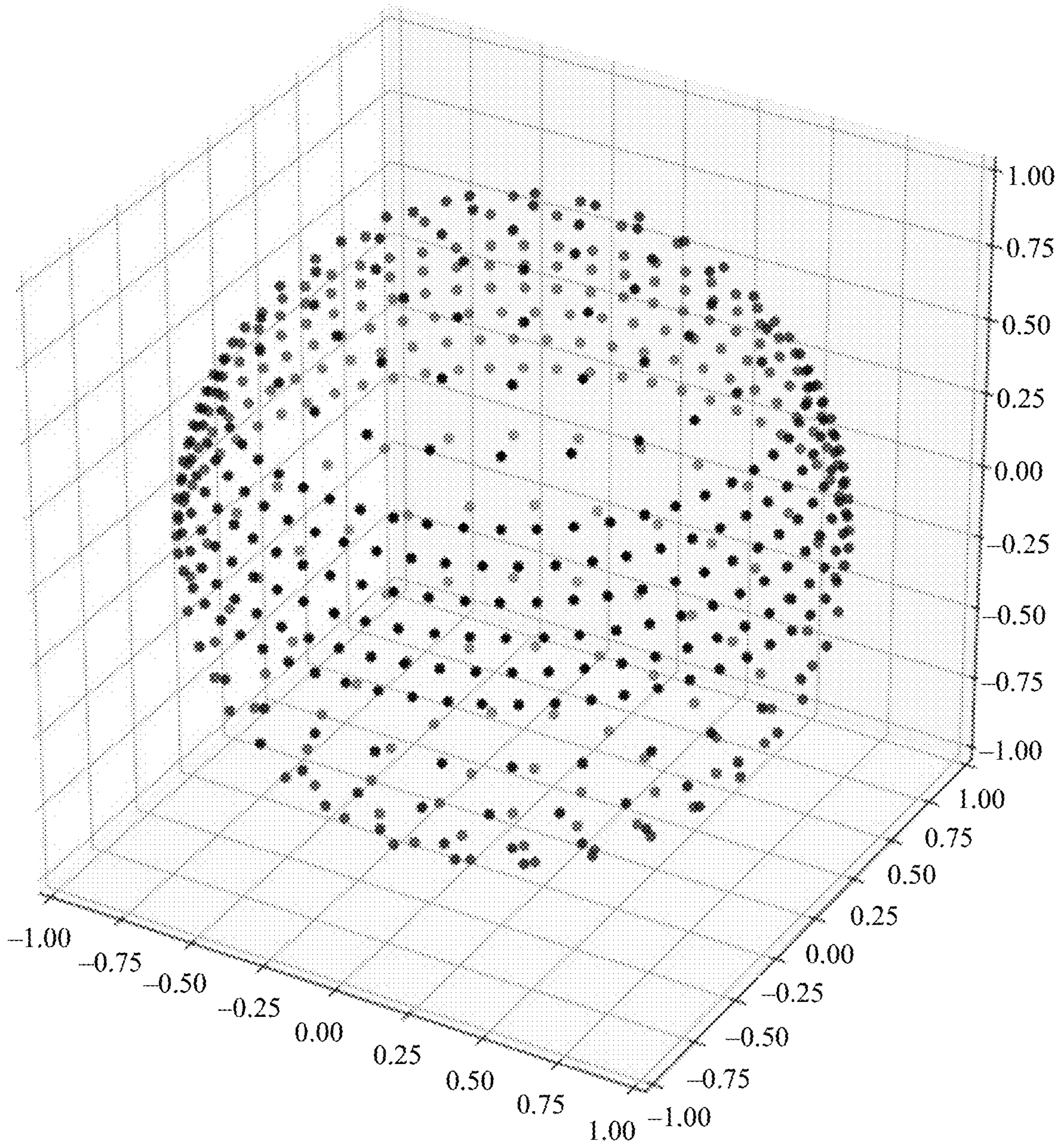
FIG. 5*a* and FIG. 5*b* are example distribution diagrams of K virtual speakers.
Figure 5B:
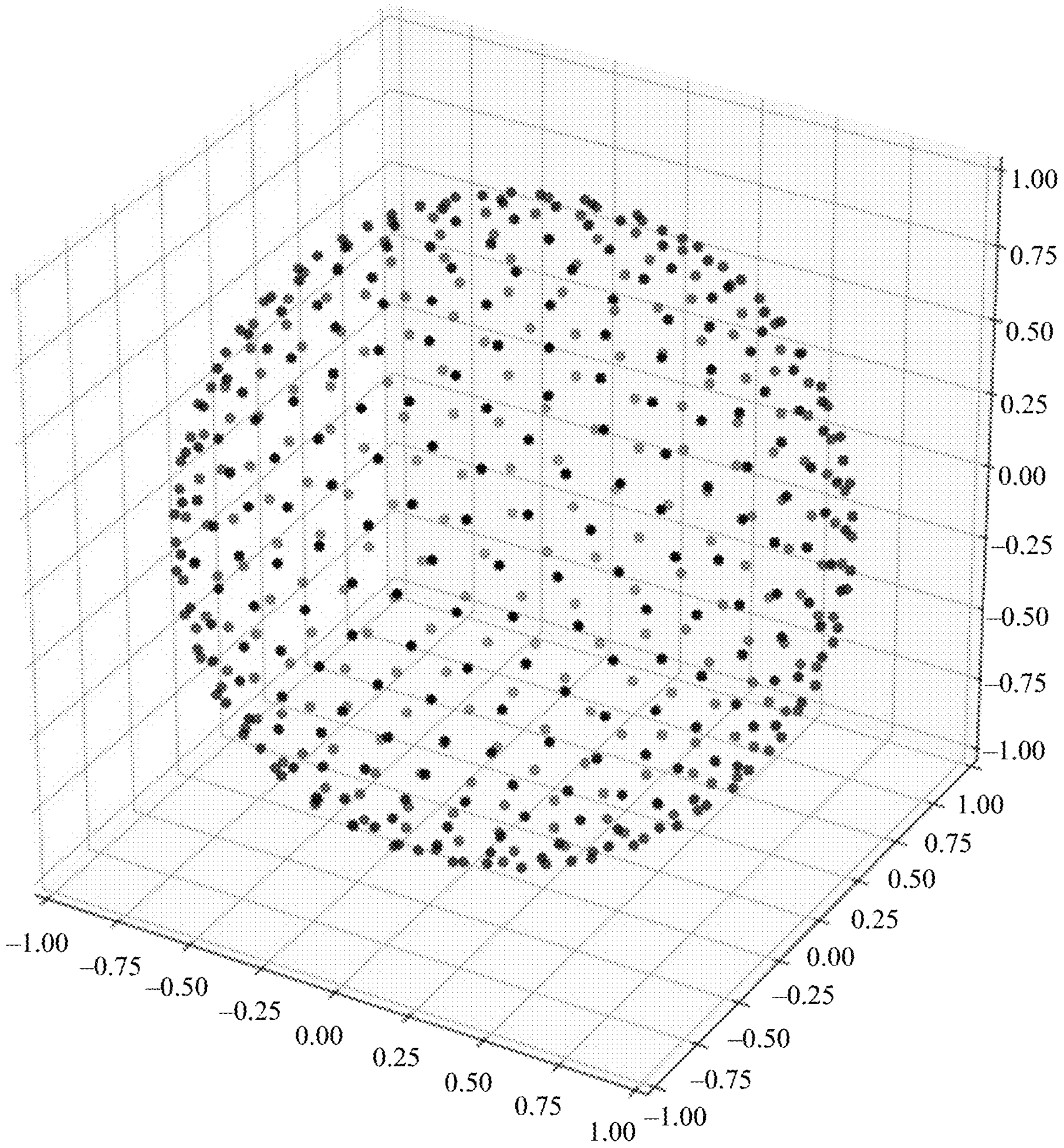

FIG. 5*a* and FIG. 5*b* are example distribution diagrams of K virtual speakers. As shown in FIG. 5*a*, an azimuth angle difference between adjacent virtual speakers in a latitude region including an equatorial latitude circle is less than an azimuth angle difference between adjacent virtual speakers in another latitude region, and $\alpha_c < \alpha_m$. As shown in FIG. 5*b*, the K virtual speakers are randomly and approximately evenly distributed on a preset sphere.

Table 1 shows a comparison between the distribution diagrams shown in FIG. 5*a* and FIG. 5*b*. Assuming that K=1669, it can be seen that an average value of signal-to-noise ratios (SNRs) of HOA reconstructed signals obtained according to the distribution method in FIG. 5*a* is higher than that of signal-to-noise ratios of HOA reconstructed signals obtained according to the distribution method in FIG. 5*b*.

TABLE 2

| File name | Distribution method in FIG. 5b SNR (dB) | Distribution method in FIG. 5a SNR (dB) |
|---|---|---|
| 1 | 12.75 | 10.86 |
| 2 | 8.83 | 12.86 |
| 3 | 13.16 | 24.85 |
| 4 | 18.66 | 11.97 |
| 5 | 12.18 | 15.04 |
| 6 | 10.85 | 13.41 |
| 7 | 6.28 | 6.31 |
| 8 | 10.49 | 11.15 |
| 9 | 12.97 | 16.16 |
| 10 | 6.93 | 6.94 |
| 11 | 8.17 | 8.66 |
| 12 | 8.11 | 8.59 |
| Average value | 10.78 | 12.23 |

As shown in Table 1, 12 different types of test audios are used in this embodiment, and the file names from 1 to 12 are respectively a single sound source speech signal, a single sound source musical instrument signal, a dual sound source speech signal, a dual sound source musical instrument signal, a triple sound source speech and musical instrument mixed signal, a quad sound source speech and musical instrument mixed signal, a dual sound source noise signal 1, a dual sound source noise signal 2, a dual sound source noise signal 3, a dual sound source noise signal 4, a dual sound source ambisonics signal 1, and a dual sound source ambisonics signal 2.

Figure 6A:
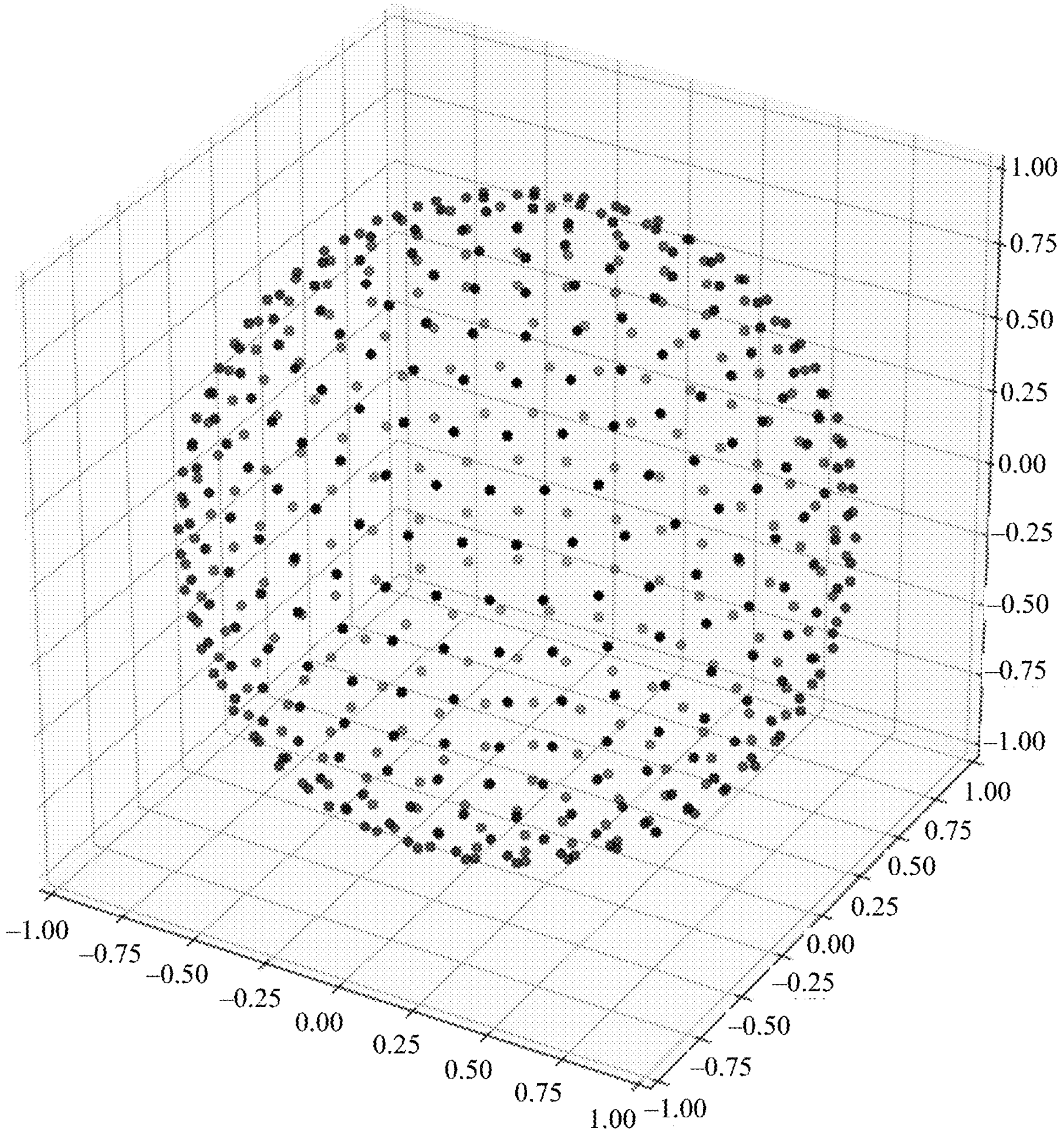
FIG. 6*a* and FIG. 6*b* are example distribution diagrams of K virtual speakers.
Figure 6B:
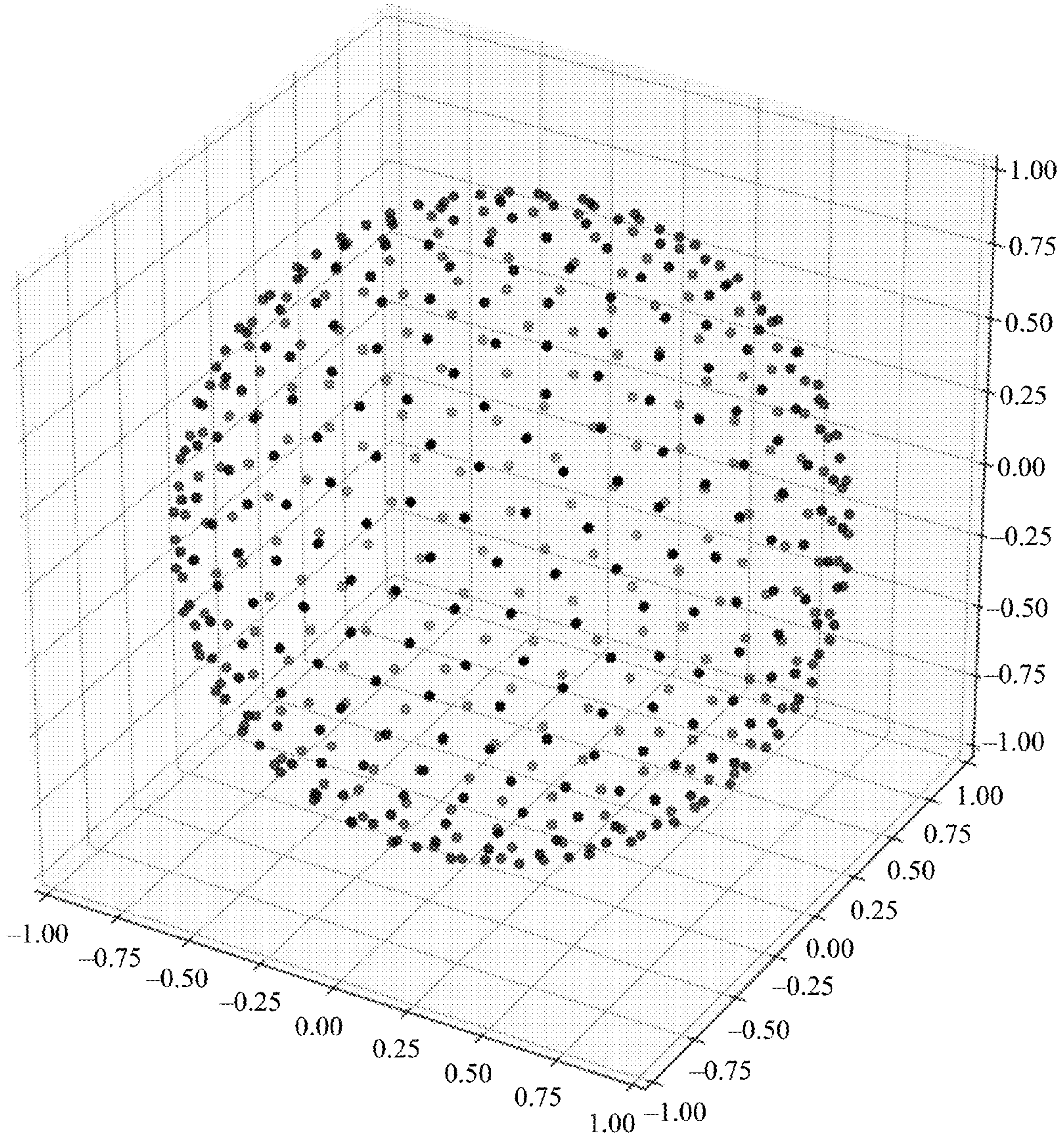

FIG. 6*a* and FIG. 6*b* are example distribution diagrams of K virtual speakers. As shown in FIG. 6*a*, azimuth angle differences between adjacent virtual speakers in L latitude regions are equal, and $\alpha_n = \alpha_m$. As shown in FIG. 6*b*, the K virtual speakers are randomly and approximately evenly distributed on a preset sphere.

Table 2 shows a comparison between the distribution diagrams shown in FIG. 6*a* and FIG. 6*b*. Assuming that K=1669, it can be seen that an average value of signal-to-noise ratios (SNRs) of HOA reconstructed signals obtained according to the distribution method in FIG. 6*a* is higher than that of signal-to-noise ratios of HOA reconstructed signals obtained according to the distribution method in FIG. 6*b*.

TABLE 3

| File name | Distribution method in FIG. 6b SNR (dB) | Distribution method in FIG. 6a SNR (dB) |
|---|---|---|
| 1 | 12.75 | 10.45 |
| 2 | 8.83 | 9.95 |
| 3 | 13.16 | 22.67 |
| 4 | 18.66 | 15.36 |
| 5 | 12.18 | 15.00 |
| 6 | 10.85 | 12.53 |
| 7 | 6.28 | 6.33 |
| 8 | 10.49 | 11.17 |
| 9 | 12.97 | 16.10 |
| 10 | 6.93 | 6.99 |
| 11 | 8.17 | 8.67 |
| 12 | 8.11 | 8.41 |
| Average value | 10.78 | 11.97 |

As shown in Table 2, 12 different types of test audios are used in this embodiment, and the file names from 1 to 12 are respectively a single sound source speech signal, a single sound source musical instrument signal, a dual sound source speech signal, a dual sound source musical instrument signal, a triple sound source speech and musical instrument mixed signal, a quad sound source speech and musical instrument mixed signal, a dual sound source noise signal 1, a dual sound source noise signal 2, a dual sound source noise signal 3, a dual sound source noise signal 4, a dual sound source ambisonics signal 1, and a dual sound source ambisonics signal 2.

For example, Table 3 is an example of a virtual speaker distribution table. In this example, K is 530. To be specific, Table 3 describes specific distribution of 530 virtual speakers whose sequence numbers range from 0 to 529. "Position" represents an azimuth angle index and an elevation angle index of a virtual speaker of a corresponding sequence number. In a "position" column in the table, a number before "," is an azimuth angle index, and a number after "," is an elevation angle index.

TABLE 4

Virtual speaker distribution table

| Sequence number | Position |
|---|---|
| 0 | 5, 768 |
| 1 | 5, 805 |
| 2 | 146, 805 |
| 3 | 293, 805 |
| 4 | 439, 805 |
| 5 | 585, 805 |
| 6 | 731, 805 |
| 7 | 878, 805 |
| 8 | 5, 841 |
| 9 | 73, 841 |
| 10 | 146, 841 |
| 11 | 219, 841 |
| 12 | 293, 841 |
| 13 | 366, 841 |
| 14 | 439, 841 |
| 15 | 512, 841 |
| 16 | 585, 841 |
| 17 | 658, 841 |
| 18 | 731, 841 |
| 19 | 805, 841 |
| 20 | 878, 841 |
| 21 | 951, 841 |
| 22 | 5, 878 |
| 23 | 54, 878 |
| 24 | 108, 878 |
| 25 | 162, 878 |
| 26 | 216, 878 |
| 27 | 269, 878 |

TABLE 4-continued

| Virtual speaker distribution table | |
|---|---|
| Sequence number | Position |
| 28 | 323, 878 |
| 29 | 377, 878 |
| 30 | 431, 878 |
| 31 | 485, 878 |
| 32 | 539, 878 |
| 33 | 593, 878 |
| 34 | 647, 878 |
| 35 | 701, 878 |
| 36 | 755, 878 |
| 37 | 808, 878 |
| 38 | 862, 878 |
| 39 | 916, 878 |
| 40 | 970, 878 |
| 41 | 5, 914 |
| 42 | 43, 914 |
| 43 | 85, 914 |
| 44 | 128, 914 |
| 45 | 171, 914 |
| 46 | 213, 914 |
| 47 | 256, 914 |
| 48 | 299, 914 |
| 49 | 341, 914 |
| 50 | 384, 914 |
| 51 | 427, 914 |
| 52 | 469, 914 |
| 53 | 512, 914 |
| 54 | 555, 914 |
| 55 | 597, 914 |
| 56 | 640, 914 |
| 57 | 683, 914 |
| 58 | 725, 914 |
| 59 | 768, 914 |
| 60 | 811, 914 |
| 61 | 853, 914 |
| 62 | 896, 914 |
| 63 | 939, 914 |
| 64 | 981, 914 |
| 65 | 5, 951 |
| 66 | 37, 951 |
| 67 | 73, 951 |
| 68 | 110, 951 |
| 69 | 146, 951 |
| 70 | 183, 951 |
| 71 | 219, 951 |
| 72 | 256, 951 |
| 73 | 293, 951 |
| 74 | 329, 951 |
| 75 | 366, 951 |
| 76 | 402, 951 |
| 77 | 439, 951 |
| 78 | 475, 951 |
| 79 | 512, 951 |
| 80 | 549, 951 |
| 81 | 585, 951 |
| 82 | 622, 951 |
| 83 | 658, 951 |
| 84 | 695, 951 |
| 85 | 731, 951 |
| 86 | 768, 951 |
| 87 | 805, 951 |
| 88 | 841, 951 |
| 89 | 878, 951 |
| 90 | 914, 951 |
| 91 | 951, 951 |
| 92 | 987, 951 |
| 93 | 5, 987 |
| 94 | 34, 987 |
| 95 | 68, 987 |
| 96 | 102, 987 |
| 97 | 137, 987 |
| 98 | 171, 987 |
| 99 | 205, 987 |
| 100 | 239, 987 |
| 101 | 273, 987 |
| 102 | 307, 987 |
| 103 | 341, 987 |

TABLE 4-continued

| Virtual speaker distribution table | |
|---|---|
| Sequence number | Position |
| 104 | 375, 987 |
| 105 | 410, 987 |
| 106 | 444, 987 |
| 107 | 478, 987 |
| 108 | 512, 987 |
| 109 | 546, 987 |
| 110 | 580, 987 |
| 111 | 614, 987 |
| 112 | 649, 987 |
| 113 | 683, 987 |
| 114 | 717, 987 |
| 115 | 751, 987 |
| 116 | 785, 987 |
| 117 | 819, 987 |
| 118 | 853, 987 |
| 119 | 887, 987 |
| 120 | 922, 987 |
| 121 | 956, 987 |
| 122 | 990, 987 |
| 123 | 5, 256 |
| 124 | 5, 222 |
| 125 | 146, 222 |
| 126 | 293, 222 |
| 127 | 439, 222 |
| 128 | 585, 222 |
| 129 | 731, 222 |
| 130 | 878, 222 |
| 131 | 5, 188 |
| 132 | 79, 188 |
| 133 | 158, 188 |
| 134 | 236, 188 |
| 135 | 315, 188 |
| 136 | 394, 188 |
| 137 | 473, 188 |
| 138 | 551, 188 |
| 139 | 630, 188 |
| 140 | 709, 188 |
| 141 | 788, 188 |
| 142 | 866, 188 |
| 143 | 945, 188 |
| 144 | 5, 154 |
| 145 | 57, 154 |
| 146 | 114, 154 |
| 147 | 171, 154 |
| 148 | 228, 154 |
| 149 | 284, 154 |
| 150 | 341, 154 |
| 151 | 398, 154 |
| 152 | 455, 154 |
| 153 | 512, 154 |
| 154 | 569, 154 |
| 155 | 626, 154 |
| 156 | 683, 154 |
| 157 | 740, 154 |
| 158 | 796, 154 |
| 159 | 853, 154 |
| 160 | 910, 154 |
| 161 | 967, 154 |
| 162 | 5, 119 |
| 163 | 45, 119 |
| 164 | 89, 119 |
| 165 | 134, 119 |
| 166 | 178, 119 |
| 167 | 223, 119 |
| 168 | 267, 119 |
| 169 | 312, 119 |
| 170 | 356, 119 |
| 171 | 401, 119 |
| 172 | 445, 119 |
| 173 | 490, 119 |
| 174 | 534, 119 |
| 175 | 579, 119 |
| 176 | 623, 119 |
| 177 | 668, 119 |
| 178 | 712, 119 |
| 179 | 757, 119 |

TABLE 4-continued

| Virtual speaker distribution table | |
|---|---|
| Sequence number | Position |
| 180 | 801, 119 |
| 181 | 846, 119 |
| 182 | 890, 119 |
| 183 | 935, 119 |
| 184 | 979, 119 |
| 185 | 5, 5 |
| 186 | 17, 5 |
| 187 | 34, 5 |
| 188 | 50, 5 |
| 189 | 67, 5 |
| 190 | 84, 5 |
| 191 | 101, 5 |
| 192 | 118, 5 |
| 193 | 134, 5 |
| 194 | 151, 5 |
| 195 | 168, 5 |
| 196 | 185, 5 |
| 197 | 201, 5 |
| 198 | 218, 5 |
| 199 | 235, 5 |
| 200 | 252, 5 |
| 201 | 269, 5 |
| 202 | 285, 5 |
| 203 | 302, 5 |
| 204 | 319, 5 |
| 205 | 336, 5 |
| 206 | 353, 5 |
| 207 | 369, 5 |
| 208 | 386, 5 |
| 209 | 403, 5 |
| 210 | 420, 5 |
| 211 | 436, 5 |
| 212 | 453, 5 |
| 213 | 470, 5 |
| 214 | 487, 5 |
| 215 | 504, 5 |
| 216 | 520, 5 |
| 217 | 537, 5 |
| 218 | 554, 5 |
| 219 | 571, 5 |
| 220 | 588, 5 |
| 221 | 604, 5 |
| 222 | 621, 5 |
| 223 | 638, 5 |
| 224 | 655, 5 |
| 225 | 671, 5 |
| 226 | 688, 5 |
| 227 | 705, 5 |
| 228 | 722, 5 |
| 229 | 739, 5 |
| 230 | 755, 5 |
| 231 | 772, 5 |
| 232 | 789, 5 |
| 233 | 806, 5 |
| 234 | 823, 5 |
| 235 | 839, 5 |
| 236 | 856, 5 |
| 237 | 873, 5 |
| 238 | 890, 5 |
| 239 | 906, 5 |
| 240 | 923, 5 |
| 241 | 940, 5 |
| 242 | 957, 5 |
| 243 | 974, 5 |
| 244 | 990, 5 |
| 245 | 1007, 5 |
| 246 | 5, 17 |
| 247 | 17, 17 |
| 248 | 34, 17 |
| 249 | 51, 17 |
| 250 | 68, 17 |
| 251 | 85, 17 |
| 252 | 102, 17 |
| 253 | 119, 17 |
| 254 | 137, 17 |
| 255 | 154, 17 |

TABLE 4-continued

| Virtual speaker distribution table | |
|---|---|
| Sequence number | Position |
| 256 | 171, 17 |
| 257 | 188, 17 |
| 258 | 205, 17 |
| 259 | 222, 17 |
| 260 | 239, 17 |
| 261 | 256, 17 |
| 262 | 273, 17 |
| 263 | 290, 17 |
| 264 | 307, 17 |
| 265 | 324, 17 |
| 266 | 341, 17 |
| 267 | 358, 17 |
| 268 | 375, 17 |
| 269 | 393, 17 |
| 270 | 410, 17 |
| 271 | 427, 17 |
| 272 | 444, 17 |
| 273 | 461, 17 |
| 274 | 478, 17 |
| 275 | 495, 17 |
| 276 | 512, 17 |
| 277 | 529, 17 |
| 278 | 546, 17 |
| 279 | 563, 17 |
| 280 | 580, 17 |
| 281 | 597, 17 |
| 282 | 614, 17 |
| 283 | 631, 17 |
| 284 | 649, 17 |
| 285 | 666, 17 |
| 286 | 683, 17 |
| 287 | 700, 17 |
| 288 | 717, 17 |
| 289 | 734, 17 |
| 290 | 751, 17 |
| 291 | 768, 17 |
| 292 | 785, 17 |
| 293 | 802, 17 |
| 294 | 819, 17 |
| 295 | 836, 17 |
| 296 | 853, 17 |
| 297 | 870, 17 |
| 298 | 887, 17 |
| 299 | 905, 17 |
| 300 | 922, 17 |
| 301 | 939, 17 |
| 302 | 956, 17 |
| 303 | 973, 17 |
| 304 | 990, 17 |
| 305 | 1007, 17 |
| 306 | 5, 34 |
| 307 | 17, 34 |
| 308 | 35, 34 |
| 309 | 52, 34 |
| 310 | 69, 34 |
| 311 | 87, 34 |
| 312 | 104, 34 |
| 313 | 121, 34 |
| 314 | 139, 34 |
| 315 | 156, 34 |
| 316 | 174, 34 |
| 317 | 191, 34 |
| 318 | 208, 34 |
| 319 | 226, 34 |
| 320 | 243, 34 |
| 321 | 260, 34 |
| 322 | 278, 34 |
| 323 | 295, 34 |
| 324 | 312, 34 |
| 325 | 330, 34 |
| 326 | 347, 34 |
| 327 | 364, 34 |
| 328 | 382, 34 |
| 329 | 399, 34 |
| 330 | 417, 34 |
| 331 | 434, 34 |

TABLE 4-continued

Virtual speaker distribution table

| Sequence number | Position |
|---|---|
| 332 | 451, 34 |
| 333 | 469, 34 |
| 334 | 486, 34 |
| 335 | 503, 34 |
| 336 | 521, 34 |
| 337 | 538, 34 |
| 338 | 555, 34 |
| 339 | 573, 34 |
| 340 | 590, 34 |
| 341 | 607, 34 |
| 342 | 625, 34 |
| 343 | 642, 34 |
| 344 | 660, 34 |
| 345 | 677, 34 |
| 346 | 694, 34 |
| 347 | 712, 34 |
| 348 | 729, 34 |
| 349 | 746, 34 |
| 350 | 764, 34 |
| 351 | 781, 34 |
| 352 | 798, 34 |
| 353 | 816, 34 |
| 354 | 833, 34 |
| 355 | 850, 34 |
| 356 | 868, 34 |
| 357 | 885, 34 |
| 358 | 903, 34 |
| 359 | 920, 34 |
| 360 | 937, 34 |
| 361 | 955, 34 |
| 362 | 972, 34 |
| 363 | 989, 34 |
| 364 | 1007, 34 |
| 365 | 5, 51 |
| 366 | 18, 51 |
| 367 | 35, 51 |
| 368 | 53, 51 |
| 369 | 71, 51 |
| 370 | 88, 51 |
| 371 | 106, 51 |
| 372 | 124, 51 |
| 373 | 141, 51 |
| 374 | 159, 51 |
| 375 | 177, 51 |
| 376 | 194, 51 |
| 377 | 212, 51 |
| 378 | 230, 51 |
| 379 | 247, 51 |
| 380 | 265, 51 |
| 381 | 282, 51 |
| 382 | 300, 51 |
| 383 | 318, 51 |
| 384 | 335, 51 |
| 385 | 353, 51 |
| 386 | 371, 51 |
| 387 | 388, 51 |
| 388 | 406, 51 |
| 389 | 424, 51 |
| 390 | 441, 51 |
| 391 | 459, 51 |
| 392 | 477, 51 |
| 393 | 494, 51 |
| 394 | 512, 51 |
| 395 | 530, 51 |
| 396 | 547, 51 |
| 397 | 565, 51 |
| 398 | 583, 51 |
| 399 | 600, 51 |
| 400 | 618, 51 |
| 401 | 636, 51 |
| 402 | 653, 51 |
| 403 | 671, 51 |
| 404 | 689, 51 |
| 405 | 706, 51 |
| 406 | 724, 51 |
| 407 | 742, 51 |

TABLE 4-continued

Virtual speaker distribution table

| Sequence number | Position |
|---|---|
| 408 | 759, 51 |
| 409 | 777, 51 |
| 410 | 794, 51 |
| 411 | 812, 51 |
| 412 | 830, 51 |
| 413 | 847, 51 |
| 414 | 865, 51 |
| 415 | 883, 51 |
| 416 | 900, 51 |
| 417 | 918, 51 |
| 418 | 936, 51 |
| 419 | 953, 51 |
| 420 | 971, 51 |
| 421 | 989, 51 |
| 422 | 1006, 51 |
| 423 | 5, 68 |
| 424 | 19, 68 |
| 425 | 37, 68 |
| 426 | 56, 68 |
| 427 | 74, 68 |
| 428 | 93, 68 |
| 429 | 112, 68 |
| 430 | 130, 68 |
| 431 | 149, 68 |
| 432 | 168, 68 |
| 433 | 186, 68 |
| 434 | 205, 68 |
| 435 | 223, 68 |
| 436 | 242, 68 |
| 437 | 261, 68 |
| 438 | 279, 68 |
| 439 | 298, 68 |
| 440 | 317, 68 |
| 441 | 335, 68 |
| 442 | 354, 68 |
| 443 | 372, 68 |
| 444 | 391, 68 |
| 445 | 410, 68 |
| 446 | 428, 68 |
| 447 | 447, 68 |
| 448 | 465, 68 |
| 449 | 484, 68 |
| 450 | 503, 68 |
| 451 | 521, 68 |
| 452 | 540, 68 |
| 453 | 559, 68 |
| 454 | 577, 68 |
| 455 | 596, 68 |
| 456 | 614, 68 |
| 457 | 633, 68 |
| 458 | 652, 68 |
| 459 | 670, 68 |
| 460 | 689, 68 |
| 461 | 707, 68 |
| 462 | 726, 68 |
| 463 | 745, 68 |
| 464 | 763, 68 |
| 465 | 782, 68 |
| 466 | 801, 68 |
| 467 | 819, 68 |
| 468 | 838, 68 |
| 469 | 856, 68 |
| 470 | 875, 68 |
| 471 | 894, 68 |
| 472 | 912, 68 |
| 473 | 931, 68 |
| 474 | 950, 68 |
| 475 | 968, 68 |
| 476 | 987, 68 |
| 477 | 1005, 68 |
| 478 | 5, 85 |
| 479 | 20, 85 |
| 480 | 39, 85 |
| 481 | 59, 85 |
| 482 | 79, 85 |
| 483 | 98, 85 |

TABLE 4-continued

| Virtual speaker distribution table | |
|---|---|
| Sequence number | Position |
| 484 | 118, 85 |
| 485 | 138, 85 |
| 486 | 158, 85 |
| 487 | 177, 85 |
| 488 | 197, 85 |
| 489 | 217, 85 |
| 490 | 236, 85 |
| 491 | 256, 85 |
| 492 | 276, 85 |
| 493 | 295, 85 |
| 494 | 315, 85 |
| 495 | 335, 85 |
| 496 | 354, 85 |
| 497 | 374, 85 |
| 498 | 394, 85 |
| 499 | 414, 85 |
| 500 | 433, 85 |
| 501 | 453, 85 |
| 502 | 473, 85 |
| 503 | 492, 85 |
| 504 | 512, 85 |
| 505 | 532, 85 |
| 506 | 551, 85 |
| 507 | 571, 85 |
| 508 | 591, 85 |
| 509 | 610, 85 |
| 510 | 630, 85 |
| 511 | 650, 85 |
| 512 | 670, 85 |
| 513 | 689, 85 |
| 514 | 709, 85 |
| 515 | 729, 85 |
| 516 | 748, 85 |
| 517 | 768, 85 |
| 518 | 788, 85 |
| 519 | 807, 85 |
| 520 | 827, 85 |
| 521 | 847, 85 |
| 522 | 866, 85 |
| 523 | 886, 85 |
| 524 | 906, 85 |
| 525 | 926, 85 |
| 526 | 945, 85 |
| 527 | 965, 85 |
| 528 | 985, 85 |
| 529 | 1004, 85 |

It should be noted that, a sphere on which the virtual speakers are distributed in Table 3 includes 1024 longitude circles and 1024 latitude circles (where the south pole point and the north pole point also each correspond to one latitude circle), the 1024 longitude circles and the 1024 latitude circles correspond to 1024×1022+2=1046530 intersection points, and the 1046530 intersection points each have a respective elevation angle and azimuth angle. Correspondingly, the 1046530 intersection points each have a respective elevation angle index and azimuth angle index, and positions of the 530 virtual speakers in Table 3 are 530 of the 1046530 intersection points. The elevation angle indexes in Table 3 are obtained through calculation based on a fact that an elevation angle of an equator is 0. To be specific, elevation angles corresponding to an elevation angle index other than that of the equator are all elevation angles relative to a plane on which the equator is located.

2. F Preset Virtual Speakers

F virtual speakers meet the following condition: An azimuth angle difference $\alpha_{mi}$ between adjacent virtual speakers distributed on an $m_i^{th}$ latitude circle in the F virtual speakers is greater than $\alpha_m$, and the $m_i^{th}$ latitude circle is one of latitude circles in an $m^{th}$ latitude region.

For ease of description, a virtual speaker in K virtual speakers is referred to as a candidate virtual speaker, and any virtual speaker in the F virtual speakers is referred to as a central virtual speaker (which may also be referred to as a first-round virtual speaker). To be specific, for any latitude circle on a preset sphere, one or more virtual speakers may be selected from a plurality of candidate virtual speakers distributed on the latitude circle as the central virtual speaker, and the central virtual speaker is added to the F virtual speakers. If a plurality of virtual speakers are selected, an azimuth angle difference $\alpha_{mi}$ between adjacent central virtual speakers is greater than the azimuth angle difference am between the adjacent candidate virtual speakers, and this may be expressed as $\alpha_{mi}>\alpha_m$. That is, for a specific latitude circle, a plurality of candidate virtual speakers are distributed. The central virtual speakers are selected from the plurality of candidate virtual speakers, and have lower density. For example, an azimuth angle difference am between adjacent candidate virtual speakers on the latitude circle is equal to 5°, and an azimuth angle difference $\alpha_{mi}$ between adjacent center virtual speakers is equal to 8°.

In one embodiment, $\alpha_{mi}=q\times\alpha_m$, where q is a positive integer greater than 1. It can be seen that the azimuth angle difference between the adjacent central virtual speakers and the azimuth angle difference between the adjacent candidate virtual speakers are in a multiple relationship. For example, the azimuth angle difference am between the adjacent candidate virtual speakers on the latitude circle is equal to 5°, and the azimuth angle difference $\alpha_{mi}$ between the adjacent center virtual speakers is equal to 10°.

3. Each of F Virtual Speakers Corresponds to S Virtual Speakers

For ease of description, a virtual speaker in S virtual speakers is referred to as a target virtual speaker. To be specific, S virtual speakers corresponding to any central virtual speaker meet the following conditions: The S virtual speakers include the any central virtual speaker and (S−1) virtual speakers located around the any central virtual speaker, where any one of (S−1) correlations between the any central virtual speaker and the (S−1) virtual speakers is greater than each of (K−S) correlations between (K−S) virtual speakers of the K virtual speakers other than the S virtual speakers and the any central virtual speaker.

That is, S $R_{fk}$s corresponding to the S virtual speakers are S largest $R_{fk}$s in K $R_{fk}$s corresponding to the K virtual speakers. When the K $R_{fk}$s are sorted in descending order, the first S $R_{fk}$s are the largest S $R_{fk}$s.

$R_{fk}$ represents a correlation between the any central virtual speaker and a $k^{th}$ virtual speaker in the K virtual speakers, and $R_{fk}$ satisfies the following formula:

$$R_{fk}=B_f(\theta,\varphi)\cdot B_k(\theta,\varphi)$$

θ represents an azimuth angle of the any virtual speaker, φ represents an elevation angle of the any virtual speaker, $B_f(\theta, \varphi)$ represents HOA coefficients of the any virtual speaker, and $B_k(\theta, \varphi)$ represents HOA coefficients of the $k^{th}$ virtual speaker of the K virtual speakers.

S virtual speakers may be determined for each central virtual speaker according to the foregoing method. It should be understood that, in this application, the F virtual speakers from the K virtual speakers are preset. Therefore, a position of each central virtual speaker may also be represented by an elevation angle index and an azimuth angle index. Besides, each central virtual speaker corresponds to the S virtual speakers, and the S virtual speakers are also from the K virtual speakers. Therefore, a position of each target virtual speaker may also be represented by an elevation angle index and an azimuth angle index.

Figure 7:
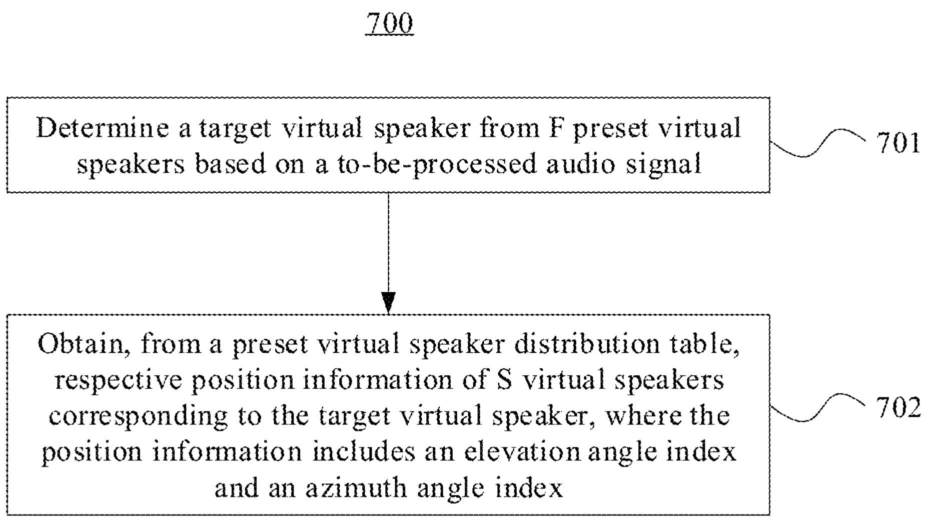
FIG. 7 is an example flowchart of a method for determining a virtual speaker set according to this application.

FIG. 7 is an example flowchart of a method for determining a virtual speaker set according to this application. A process 700 may be performed by the encoder 20 or the decoder 30 in the foregoing embodiment. That is, the encoder 20 in an audio sending device implements audio encoding, and then sends the bitstream to an audio receiving device. The decoder 30 in the audio receiving device decodes the bitstream to obtain a target audio frame, and then performs rendering based on the target audio frame to obtain one or more sound field audio signals corresponding to one or more virtual speakers. The process 700 is described as a series of operations or operations. It should be understood that the process 700 may be performed in various sequences and/or simultaneously, and is not limited to an execution sequence shown in FIG. 7. As shown in FIG. 7, the method includes the following operations.

Step 701: Determine a target virtual speaker from F preset virtual speakers based on a to-be-processed audio signal.

As described above, encoding analysis is performed on the to-be-processed audio signal. For example, sound field distribution of the to-be-processed audio signal is analyzed, including characteristics such as a quantity of sound sources, directivity, and dispersion of the audio signal, to obtain an HOA coefficient of the audio signal, and the HOA coefficient is used as one of determining conditions for determining how to select the target virtual speaker. A virtual speaker matching the to-be-processed audio signal may be selected based on the HOA coefficient of the to-be-processed audio signal and HOA coefficients of candidate virtual speakers (namely, the foregoing F virtual speakers). In this application, the virtual speaker is referred to as the target virtual speaker.

In one embodiment, the HOA coefficient of the audio signal may be obtained first, and then F groups of HOA coefficients corresponding to the F virtual speakers are obtained, where the F virtual speakers are in one-to-one correspondence with the F groups of HOA coefficients; and then a virtual speaker corresponding to a group of HOA coefficients that has a greatest correlation with the HOA coefficient of the audio signal and that is in the F groups of HOA coefficients is determined as the target virtual speaker.

In this application, an inner product may be separately performed between the HOA coefficients of the F virtual speakers and the HOA coefficient of the audio signal, and a virtual speaker with a maximum absolute value of the inner product is selected as the target virtual speaker. To be specific, each group of the F groups of HOA coefficients includes $(N+1)^2$ coefficients, the HOA coefficient of the audio signal includes $(N+1)^2$ coefficients, and N represents an order of the audio signal. Therefore, the HOA coefficient of the audio signal is in one-to-one correspondence with each group of the F groups of HOA coefficients. Based on this correspondence, an inner product is performed between the HOA coefficient of the audio signal and each group of the F groups of HOA coefficients, and a correlation between the HOA coefficient of the audio signal and each group of the F groups of HOA coefficients is obtained. It should be noted that the target virtual speaker may alternatively be determined by using another method, and this is not specifically limited in this application.

Step 702: Obtain, from a preset virtual speaker distribution table, respective position information of S virtual speakers corresponding to the target virtual speaker, where the position information includes an elevation angle index and an azimuth angle index.

Based on the foregoing presetting in this application, once the target virtual speaker (namely, a central virtual speaker) is determined, the S virtual speakers corresponding to the target virtual speaker may be obtained. The position information of the S virtual speakers may be obtained based on the earliest set virtual speaker distribution table. A same representation method is used for K virtual speakers, and the position information of the S virtual speakers is each represented by the elevation angle index and the azimuth angle index.

It can be seen that, when the target virtual speaker is determined, the target virtual speaker is a central virtual speaker having a highest correlation with the HOA coefficient of the to-be-processed audio signal. S virtual speakers corresponding to each central virtual speaker are S virtual speakers having highest correlations with HOA coefficients of the central virtual speaker. Therefore, the S virtual speakers corresponding to the target virtual speaker are also S virtual speakers having highest correlations with the HOA coefficient of the to-be-processed audio signal.

In this application, the virtual speaker distribution table is preset, so that a high average value of signal-to-noise ratios (SNRs) of HOA reconstructed signals can be obtained by deploying virtual speakers according to the distribution table, and the S virtual speakers having highest correlations with the HOA coefficient of the to-be-processed audio signal are selected based on such distribution, thereby achieving an optimal sampling effect and improving an audio signal playback effect.

Figure 8:
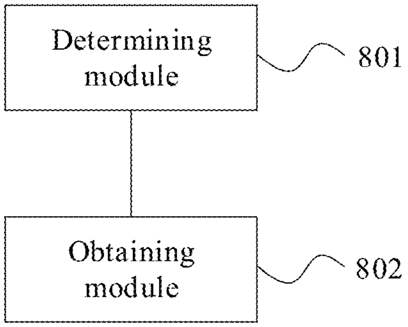
FIG. 8 is an example diagram of a structure of an apparatus for determining a virtual speaker set according to this application.

FIG. 8 is an example diagram of a structure of an apparatus for determining a virtual speaker set according to this application. As shown in FIG. 8, the apparatus may be used in the encoder 20 or the decoder 30 in the foregoing embodiments. The apparatus for determining a virtual speaker set in this embodiment may include a determining module 801 and an obtaining module 802. The determining module 801 is configured to determine a target virtual speaker from F preset virtual speakers based on a to-be-processed audio signal, where each of the F virtual speakers corresponds to S virtual speakers, F is a positive integer, and S is a positive integer greater than 1. The obtaining module 802 is configured to obtain, from a preset virtual speaker distribution table, respective position information of S virtual speakers corresponding to the target virtual speaker, where the virtual speaker distribution table includes position information of K virtual speakers, the position information includes an elevation angle index and an azimuth angle index, K is a positive integer greater than 1, $F \le K$, and $F \times S \ge K$.

In one embodiment, the determining module 801 is specifically configured to: obtain a higher order ambisonics HOA coefficient of the audio signal; obtain F groups of HOA coefficients corresponding to the F virtual speakers, where the F virtual speakers are in one-to-one correspondence with the F groups of HOA coefficients; and determine, as the target virtual speaker, a virtual speaker corresponding to a group of HOA coefficients that has a greatest correlation with the HOA coefficient of the audio signal and that is in the F groups of HOA coefficients.

In one embodiment, the S virtual speakers corresponding to the target virtual speaker meet the following conditions: the S virtual speakers include the target virtual speaker and (S−1) virtual speakers located around the target virtual speaker, where any one of (S−1) correlations between the (S−1) virtual speakers and the target virtual speaker is greater than each of (K−S) correlations between (K−S) virtual speakers, other than the S virtual speakers, of the K virtual speakers and the target virtual speaker.

In one embodiment, the K virtual speakers meet the following conditions: the K virtual speakers are distributed on a preset sphere, and the preset sphere includes L latitude regions, where L>1; and an $m^{th}$ latitude region of the L latitude regions includes $T_m$ latitude circles, an azimuth angle difference between adjacent virtual speakers that are in the K virtual speakers and that are distributed on an $m_i^{th}$ latitude circle is $\alpha_m$, $1 \le m \le L$, $T_m$ is a positive integer, and $1 \le m_i \le Tm$, where when $T_m > 1$, an elevation angle difference between any two adjacent latitude circles in the $m^{th}$ latitude region is $\alpha_m$.

In one embodiment, an $n^{th}$ latitude region of the L latitude regions includes $T_n$ latitude circles, an azimuth angle difference between adjacent virtual speakers that are in the K virtual speakers and that are distributed on an $n_i^{th}$ latitude circle is $\alpha_n$, $1 \le n \le L$, $T_n$ is a positive integer, and $1 \le n_i \le T_n$, where when $T_n > 1$, an elevation angle difference between any two adjacent latitude circles in the $n^{th}$ latitude region is $\alpha_n$, where $\alpha_n = \alpha_m$ or $\alpha_n \ne \alpha_m$, and $n \ne m$.

In one embodiment, a $c^{th}$ latitude region of the L latitude regions includes $T_c$ latitude circles, one of the $T_c$ latitude circles is an equatorial latitude circle, an azimuth angle difference between adjacent virtual speakers that are in the K virtual speakers and that are distributed on a $c_i^{th}$ latitude circle is $\alpha_c$, $1 \le c \le L$, $T_c$ is a positive integer, and $1 \le c_i \le T_c$, where when $T_c > 1$, an elevation angle difference between any two adjacent latitude circles in the $c^{th}$ latitude region is $\alpha_c$, where $\alpha_c < \alpha_m$, and $c \ne m$.

In one embodiment, the F virtual speakers meet the following conditions: an azimuth angle difference $\alpha_{mi}$ between adjacent virtual speakers that are distributed on the $m_i^{th}$ latitude circle and that are in the F virtual speakers is greater than $\alpha_m$.

In one embodiment, $\alpha_{mi} = q \times \alpha_m$, where q is a positive integer greater than 1.

In one embodiment, a correlation $R_{fk}$ between a $k^{th}$ virtual speaker of the K virtual speakers and the target virtual speaker satisfies the following formula:

$$R_{fk} = B_f(\theta,\varphi) \cdot B_k(\theta,\varphi), \text{ where}$$

θ represents an azimuth angle of the target virtual speaker, φ represents an elevation angle of the target virtual speaker, $B_f(\theta, \varphi)$ represents the HOA coefficients of the target virtual speaker, and $B_k(\theta, \varphi)$ represents HOA coefficients of the $k^{th}$ virtual speaker of the K virtual speakers.

The apparatus in this embodiment may be used to execute the technical solution in the method embodiment shown in FIG. 7, and implementation principles and technical effects of the apparatus are similar and are not described herein again.

In an implementation process, operations in the foregoing method embodiment can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The operations of the method disclosed this application may be directly performed by a hardware encoding processor, or may be performed by a combination of hardware in an encoding processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

The memory in the foregoing embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the system and method described in this specification includes but is not limited to these memories and any memory of another proper type.

A person of ordinary skill in the art may be aware that, in combination with the examples described in embodiments disclosed in this specification, units and algorithm operations may be implemented by electronic hardware or a combination of computer software and electronic hardware. Whether functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiment. Details are not described herein again.

In the several embodiments provided in this application, it should be understood that the disclosed systems, apparatuses, and method may be implemented in other manners. For example, the described apparatus embodiments are merely examples. For example, division into the units is merely logical function division and may be other division in actual implementation. For example, a plurality of units or components may be combined or integrated into another system, or some characteristics may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a virtual speaker set, comprising:

determining a target virtual speaker from F preset virtual speakers based on a to-be-processed audio signal, wherein each of the F preset virtual speakers corresponds to S virtual speakers, wherein F is a positive integer, and wherein S is a positive integer greater than 1; and obtaining, from a preset virtual speaker distribution table, respective position information of S virtual speakers corresponding to the target virtual speaker, wherein the virtual speaker distribution table comprises position information of K virtual speakers, wherein the position information comprises an elevation angle index and an azimuth angle index, wherein K is a positive integer greater than 1, $F \leq K$, and wherein $F \times S \geq K$.

2. The method according to claim 1, wherein the determining the target virtual speaker from the F preset virtual speakers based on the to-be-processed audio signal comprises:

obtaining a higher order ambisonics (HOA) coefficient of the audio signal;

obtaining F groups of HOA coefficients corresponding to the F preset virtual speakers, wherein the F preset virtual speakers are in one-to-one correspondence with the F groups of HOA coefficients; and determining, as the target virtual speaker, a virtual speaker corresponding to a group of HOA coefficients that has a greatest correlation with the HOA coefficient of the audio signal and that is in the F groups of HOA coefficients.

3. The method according to claim 1, wherein the S virtual speakers corresponding to the target virtual speaker meet following conditions:

the S virtual speakers comprise the target virtual speaker and (S−1) virtual speakers located around the target virtual speaker, wherein any one of (S−1) correlations between the (S−1) virtual speakers and the target virtual speaker is greater than each of (K−S) correlations between (K−S) virtual speakers, other than the S virtual speakers, of the K virtual speakers and the target virtual speaker.

4. The method according to claim 1, wherein the K virtual speakers meet following conditions:

the K virtual speakers are distributed on a preset sphere, and the preset sphere comprises L latitude regions, wherein $L>1$; and an $m^{th}$ latitude region of the L latitude regions comprises $T_m$ latitude circles, wherein an azimuth angle difference between adjacent virtual speakers that are in the K virtual speakers and that are distributed on an $m_i^{th}$ latitude circle is $\alpha_m$, wherein $1 \leq m \leq L$, wherein $T_m$ is a positive integer, and wherein $1 \leq m_i \leq T_m$, wherein when $T_m>1$, an elevation angle difference between any two adjacent latitude circles in the $m^{th}$ latitude region is $\alpha_m$.

5. The method according to claim 4, wherein an $n^{th}$ latitude region of the L latitude regions comprises $T_n$ latitude circles, wherein an azimuth angle difference between adjacent virtual speakers that are in the K virtual speakers and that are distributed on an $n_i^{th}$ latitude circle is $\alpha_n$, $1 \leq n \leq L$, $T_n$ is a positive integer, and $1 \leq n_i \leq T_n$, wherein when $T_n>1$, an elevation angle difference between any two adjacent latitude circles in the $n^{th}$ latitude region is $\alpha_n$, wherein $\alpha_n = \alpha_m$ or $\alpha_n \neq \alpha_m$, and $n \neq m$.

6. The method according to claim 4, wherein a $c^{th}$ latitude region of the L latitude regions comprises $T_c$ latitude circles, wherein one of the $T_c$ latitude circles is an equatorial latitude circle, wherein an azimuth angle difference between adjacent virtual speakers that are in the K virtual speakers and that are distributed on a $c_i^{th}$ latitude circle is $\alpha_c$, wherein $1 \leq c \leq L$, wherein $T_c$ is a positive integer, and wherein $1 \leq c_i \leq T_c$, wherein when $T_c>1$, an elevation angle difference between any two adjacent latitude circles in the $c^{th}$ latitude region is $\alpha_c$, wherein $\alpha_c < \alpha_m$, and $c \neq m$.

7. The method according to claim 4, wherein the F virtual speakers further meet following conditions:

an azimuth angle difference $\alpha_{mi}$ between adjacent virtual speakers that are distributed on the $m_i^{th}$ latitude circle and that are in the F virtual speakers is greater than $\alpha_m$.

8. The method according to claim 7, wherein $\alpha_{mi} = q \times \alpha_m$, and wherein q is a positive integer greater than 1.

9. The method according to claim 3, wherein a correlation $R_{fk}$ between a $k^{th}$ virtual speaker of the K virtual speakers and the target virtual speaker satisfies following formula:

$$R_{fk} = B_f(\theta,\varphi) \cdot B_k(\theta,\varphi), \text{ wherein}$$

θ represents an azimuth angle of the target virtual speaker, φ represents an elevation angle of the target virtual speaker, $B_f(\theta, \varphi)$ represents the HOA coefficients of the target virtual speaker, and $B_k(\theta, \varphi)$ represents HOA coefficients of the $k^{th}$ virtual speaker.

10. An audio processing device, comprising:

one or more processors; and a memory, configured to store one or more programs, wherein when the one or more programs are executed by the one or more processors, cause the one or more processors to:

determine a target virtual speaker from F preset virtual speakers based on a to-be-processed audio signal, wherein each of the F preset virtual speakers corresponds to S virtual speakers, wherein F is a positive integer, and wherein S is a positive integer greater than 1; and obtain, from a preset virtual speaker distribution table, respective position information of S virtual speakers corresponding to the target virtual speaker, wherein the virtual speaker distribution table comprises position information of K virtual speakers, wherein the position information comprises an elevation angle index and an azimuth angle index, wherein K is a positive integer greater than 1, wherein $F \leq K$, and wherein $F \times S \geq K$.

11. The audio processing device according to claim 10, wherein the one or more processors are further to:

obtain a higher order ambisonics (HOA) coefficient of the audio signal;

obtain F groups of HOA coefficients corresponding to the F preset virtual speakers, wherein the F preset virtual speakers are in one-to-one correspondence with the F groups of HOA coefficients; and determine, as the target virtual speaker, a virtual speaker corresponding to a group of HOA coefficients that has a greatest correlation with the HOA coefficient of the audio signal and that is in the F groups of HOA coefficients.

12. The audio processing device according to claim 10, wherein the S virtual speakers corresponding to the target virtual speaker meet following conditions:

the S virtual speakers comprise the target virtual speaker and (S−1) virtual speakers located around the target virtual speaker, wherein any one of (S−1) correlations between the (S−1) virtual speakers and the target virtual speaker is greater than each of (K−S) correlations between (K−S) virtual speakers, other than the S virtual speakers, of the K virtual speakers and the target virtual speaker.

13. The audio processing device according to claim 10, wherein the K virtual speakers meet following conditions:

the K virtual speakers are distributed on a preset sphere, and the preset sphere comprises L latitude regions, wherein $L>1$; and an $m^{th}$ latitude region of the L latitude regions comprises $T_m$ latitude circles, wherein an azimuth angle difference between adjacent virtual speakers that are in the K virtual speakers and that are distributed on an $m_i^{th}$ latitude circle is $\alpha_m$, wherein $1 \leq m \leq L$, wherein $T_m$ is a positive integer, and wherein $1 \leq m_i \leq Tm$, wherein when $T_m>1$, an elevation angle difference between any two adjacent latitude circles in the $m^{th}$ latitude region is $\alpha_m$.

14. The audio processing device according to claim 13, wherein an $n^{th}$ latitude region of the L latitude regions comprises $T_n$ latitude circles, wherein an azimuth angle difference between adjacent virtual speakers that are in the K virtual speakers and that are distributed on an $n_i^{th}$ latitude circle is $\alpha_n$, wherein $1 \leq n \leq L$, wherein $T_n$ is a positive integer, and wherein $1 \leq n_i \leq T_n$, wherein when $T_n>1$, an elevation angle difference between any two adjacent latitude circles in the $n^{th}$ latitude region is $\alpha_n$, wherein $\alpha_n=\alpha_m$ or $\alpha_n \neq \alpha_m$, and $n \neq m$.

15. The audio processing device according to claim 13, wherein a $c^{th}$ latitude region of the L latitude regions comprises $T_c$ latitude circles, wherein one of the $T_c$ latitude circles is an equatorial latitude circle, wherein an azimuth angle difference between adjacent virtual speakers that are in the K virtual speakers and that are distributed on a $c_i^{th}$ latitude circle is $\alpha_c$, wherein $1 \leq c \leq L$, wherein $T_c$ is a positive integer, and wherein $1 \leq c_i \leq T_n$, wherein when $T_c>1$, an elevation angle difference between any two adjacent latitude circles in the $c^{th}$ latitude region is $\alpha_c$, wherein $\alpha_c<\alpha_m$, and $c \neq m$.

16. The audio processing device according to claim 13, wherein the F virtual speakers further meet following conditions:

an azimuth angle difference $\alpha_{mi}$ between adjacent virtual speakers that are distributed on the $m_i^{th}$ latitude circle and that are in the F virtual speakers is greater than $\alpha_m$.

17. The audio processing device according to claim 16, wherein $\alpha_{mi}=q \times \alpha_m$, and wherein q is a positive integer greater than 1.

18. The audio processing device according to claim 12, wherein a correlation $R_{fk}$ between a $k^{th}$ virtual speaker of the K virtual speakers and the target virtual speaker satisfies following formula:

$$R_{fk}=B_f(\theta,\varphi) \cdot B_k(\theta,\varphi),$$

wherein

θ represents an azimuth angle of the target virtual speaker, φ represents an elevation angle of the target virtual speaker, $B_f(\theta, \varphi)$ represents the HOA coefficients of the target virtual speaker, and $B_k(\theta, \varphi)$ represents HOA coefficients of the $k^{th}$ virtual speaker.

19. A non-transitory machine-readable medium having instructions stored therein, which when executed by a processor, cause the processor to:

determine a target virtual speaker from F preset virtual speakers based on a to-be-processed audio signal, wherein each of the F preset virtual speakers corresponds to S virtual speakers, wherein F is a positive integer, and wherein S is a positive integer greater than 1; and obtain, from a preset virtual speaker distribution table, respective position information of S virtual speakers corresponding to the target virtual speaker, wherein the virtual speaker distribution table comprises position information of K virtual speakers, wherein the position information comprises an elevation angle index and an azimuth angle index, wherein K is a positive integer greater than 1, wherein $F \leq K$, and wherein $F \times S \geq K$.

20. The non-transitory machine-readable medium according to claim 19, wherein the processor is further to:

obtain a higher order ambisonics (HOA) coefficient of the audio signal;

obtain F groups of HOA coefficients corresponding to the F preset virtual speakers, wherein the F preset virtual speakers are in one-to-one correspondence with the F groups of HOA coefficients; and determine, as the target virtual speaker, a virtual speaker corresponding to a group of HOA coefficients that has a greatest correlation with the HOA coefficient of the audio signal and that is in the F groups of HOA coefficients.

* * * * *